US011871862B2

(12) United States Patent
Shenhar et al.

(10) Patent No.: US 11,871,862 B2
(45) Date of Patent: Jan. 16, 2024

(54) ANTI-TEARING RETRACTABLE ARM FOR A COLLECTION BOX

(71) Applicant: United States Postal Service, Washington, DC (US)

(72) Inventors: Joram Shenhar, Fairfax, VA (US); Joel Locknauth Dewnandan, Bladensburg, MD (US); William Albert Tartal, Baltimore, MD (US)

(73) Assignee: United States Postal Service, Washington, DC (US)

( * ) Notice: Subject to any disclaimer, the term of this patent is extended or adjusted under 35 U.S.C. 154(b) by 34 days.

(21) Appl. No.: 17/655,513

(22) Filed: Mar. 18, 2022

(65) Prior Publication Data

US 2022/0202223 A1 Jun. 30, 2022

Related U.S. Application Data

(60) Continuation of application No. 16/934,996, filed on Jul. 21, 2020, now Pat. No. 11,337,538, which is a (Continued)

(51) Int. Cl.

| | |
|---|---|
| ***A47G 29/124*** | (2006.01) |
| ***A47G 29/122*** | (2006.01) |
| ***E05F 1/10*** | (2006.01) |
| ***A47G 29/12*** | (2006.01) |
| ***E05G 7/00*** | (2006.01) |
| ***A47G 29/22*** | (2006.01) |
| *E05F 5/08* | (2006.01) |

(52) U.S. Cl.

CPC ....... *A47G 29/1251* (2017.08); *A47G 29/122* (2013.01); *A47G 29/1207* (2013.01); *A47G 29/22* (2013.01); *E05F 1/1008* (2013.01); *E05G 7/001* (2013.01); *E05F 5/08* (2013.01); *E05Y 2201/224* (2013.01); *E05Y 2800/122* (2013.01); *E05Y 2800/41* (2013.01); *E05Y 2800/75* (2013.01)

(58) Field of Classification Search

CPC .............. A47G 29/122; A47G 29/1251; A47G 29/1207; A47G 29/22; A47G 29/141; A47G 29/12095; E05F 1/1008; E05F 5/08; E05G 7/001; F16B 7/10; F16B 7/105; F16B 7/14; E05Y 2201/224; E05Y 2800/122; E05Y 2800/41; E05Y 2800/75

USPC .......... 232/17, 45, 47, 51; 16/85, 82, 63, 65, 16/49; 109/64, 66; 403/109.2, 109.3

See application file for complete search history.

(56) References Cited

U.S. PATENT DOCUMENTS

| | | | |
|---|---|---|---|
| 459,550 | A | 9/1891 | Lenman |
| 2,398,602 | A | 4/1946 | Sibley et al. |

(Continued)

*Primary Examiner* — William L Miller

(74) *Attorney, Agent, or Firm* — Knobbe Martens Olson & Bear LLP

(57) ABSTRACT

A retractable arm device, system, and method with a locking mechanism for preventing items placed in a device or receptacle from getting stuck, damaged, or torn. The retractable arm includes an inner tube, a pawl, and an outer tube surrounding the inner tube. The inner tube slides within the outer tube and the pawl preventing the retractable arm from moving into an extended position under particular conditions. The retractable arm may be placed in a receptacle for items to prevent the door from being reopened before the door is fully closed.

16 Claims, 22 Drawing Sheets

Related U.S. Application Data division of application No. 15/986,094, filed on May 22, 2018, now Pat. No. 10,806,287.

(60) Provisional application No. 62/510,622, filed on May 24, 2017.

(56) References Cited

U.S. PATENT DOCUMENTS

| | | | | | |
|---|---|---|---|---|---|
| 2,405,730 | A | | 8/1946 | Bankson | |
| 3,347,575 | A | * | 10/1967 | Morris | F16B 7/105 403/107 |
| 3,811,455 | A | * | 5/1974 | Thur | A45B 19/04 135/25.4 |
| 4,063,520 | A | | 12/1977 | Parsons | |
| 4,247,216 | A | * | 1/1981 | Pansini | B25G 3/18 403/324 |
| 5,435,484 | A | | 7/1995 | Carlson | |
| 5,515,574 | A | * | 5/1996 | Larson | B25G 1/04 15/144.4 |
| 5,845,664 | A | * | 12/1998 | Ryder | A45B 3/04 135/65 |
| 5,954,264 | A | | 9/1999 | Keller | |
| 6,079,894 | A | * | 6/2000 | Obitts | A61H 3/02 403/109.2 |
| 6,793,110 | B2 | | 9/2004 | Hamilton | |
| 7,334,957 | B2 | * | 2/2008 | Sadinsky | E04H 12/2269 403/109.8 |
| 8,066,445 | B2 | * | 11/2011 | Kwak | H01Q 15/161 403/103 |
| 8,491,215 | B2 | * | 7/2013 | Young | B25G 3/18 403/109.3 |
| 10,147,067 | B2 | | 12/2018 | Pleis | |
| 10,210,475 | B2 | | 2/2019 | Pargoe | |
| 2003/0141638 | A1 | | 7/2003 | Salice | |
| 2003/0209596 | A1 | | 11/2003 | Swider | |
| 2003/0213663 | A1 | | 11/2003 | Salice | |
| 2003/0215283 | A1 | * | 11/2003 | Hsieh | F16B 7/105 403/109.2 |
| 2004/0094991 | A1 | * | 5/2004 | Fushimi | E05D 15/101 296/155 |
| 2004/0150143 | A1 | | 8/2004 | Zimmer et al. | |
| 2005/0006450 | A1 | | 1/2005 | Fitzgibbons et al. | |
| 2012/0034023 | A1 | * | 2/2012 | Wang | B60P 7/15 403/109.3 |
| 2013/0239365 | A1 | | 9/2013 | Payson | |
| 2014/0376990 | A1 | * | 12/2014 | Lai | F16B 7/105 403/109.3 |
| 2017/0116568 | A1 | | 4/2017 | Pleis | |
| 2017/0228692 | A1 | | 8/2017 | Pargoe | |
| 2019/0128323 | A1 | | 5/2019 | Scheuring et al. | |

* cited by examiner

ANTI-TEARING RETRACTABLE ARM FOR A COLLECTION BOX

INCORPORATION BY REFERENCE TO ANY PRIORITY APPLICATIONS

This application is a continuation of U.S. application Ser. No. 16/934,996, filed Jul. 21, 2020, which, in turn, is a divisional of U.S. patent application Ser. No. 15/986,094, filed May 22, 2018, now U.S. Pat. No. 10,806,287, which claims the benefit of U.S. Provisional Application 62/510,622, filed May 24, 2017, entitled ANTI-TEARING RETRACTABLE ARM FOR A COLLECTION BOX, the entire contents of which are hereby incorporated by reference. Any and all applications for which a foreign or domestic priority claim is identified in the Application Data Sheet as filed with the present application are hereby incorporated by reference under 37 CFR 1.57.

BACKGROUND

The present disclosure generally relates to systems, methods, and devices for preventing an item deposited in a receptacle from getting stuck, damaged, or torn. More specifically, disclosed herein are embodiments for preventing damage to and tearing of the items placed in an item collection receptacle.

SUMMARY

The devices, systems, and methods disclosed herein have several features, no single one of which is solely responsible for its desirable attributes. Without limiting the scope as expressed by the claims that follow, its more prominent features will now be discussed briefly. After considering this discussion, and particularly after reading the section entitled "Detailed Description" one will understand how the features of the system and methods provide several advantages over traditional systems and methods.

In one aspect described herein, a retractable arm comprises an outer tube comprising: a channel extending therethrough; a first opening formed in a surface of the outer tube proximate a first end of the outer tube; a second opening formed in the surface of the outer tube proximate a second end of the outer tube; and at least one aperture formed in the surface of the outer tube; an inner tube slidably disposed at least partially within the channel of the outer tube; and at least one pawl pivotably attached to the inner tube at a first end of the pawl, the pawl configured to protrude from the first opening when the inner tube is at a first position within the channel, and configured to protrude from the second opening when the inner tube is at a second position within the channel.

In some embodiments, the pawl is configured to pivot so as to be within the channel when the inner tube is at an intermediate location between the first and the second positions.

In some embodiments, the pawl comprises a curved surface and an edge, the curved surface and the edge being disposed on opposite sides of a second end of the pawl.

In some embodiments, the edge is sized and shaped to engage the at least one aperture of the outer tube.

In some embodiments, the width of the curved surface of the pawl prevents the curved surface from engaging the least one aperture of the outer tube.

In some embodiments, the pawl comprises a curved surface having a curvature corresponding to a portion of a logarithmic spiral.

In some embodiments, the retractable arm is secured to a door disposed within a housing comprising a top edge and a bottom edge, the door being rotatable about an axis from at least a closed position to an open position, wherein the retractable arm is in the first position when the door is in the closed position, wherein the retractable arm is in and the second position when the door is in the open position, and wherein the retractable arm must be in the first position before the door will rotate to the open position.

In some embodiments, the retractable arm further comprises a resilient element disposed within a channel within the inner tube configured to interact with a ridge disposed in a first end of the channel, and wherein the resilient element is moveable between a designated preload and an emergency compressed position.

In some embodiments, the resilient element is in the emergency compressed position when the at least one pawl is engaged with the at least one aperture of the outer tube and the inner tube is moved toward the open position within the channel.

In some embodiments, the pawl is configured to rotate in a first direction when the inner tube is moved from the closed position within the channel to the open position, and wherein the pawl is configured to rotate in a second direction when the inner tube is moved from the open position to the closed position.

In another aspect described herein, an item receptacle comprises a housing having an opening for receiving items; a door connected to the housing and configured to pivot about a pivot point from a closed position to an open position; and a retractable arm rotatably coupled to the door at a first end of the retractable arm and to a surface of the housing at a second end of the retractable arm, the retractable arm configured to be in a retracted position when the door is in the closed position and an extended position when the door is in the open position.

In some embodiments, the retractable arm comprises an inner tube comprising at least one pawl, the pawl rotatably connected to the inner tube; and an outer tube comprising a channel extending therethrough and at least one aperture, wherein the inner tube is at least partially disposed within the channel and is moveable within the channel.

In some embodiments, the pawl is rotatably connected to the inner tube so as to be within the aperture when the inner tube is at an intermediate location between the retracted position and the extended position.

In some embodiments, the pawl comprises a curved surface and an edge, the curved surface and the edge being disposed on opposite sides of a second end of the pawl.

In some embodiments, the edge is configured to engage the at least one aperture of the outer tube.

In some embodiments, the width of the curved surface of the pawl prevents the curved surface from engaging the least one aperture of the outer tube.

In some embodiments, when the edge of the pawl engages the at least one aperture of the outer tube, the inner tube cannot be moved to the fully extended position within the outer tube.

In some embodiments, the inner tube cannot be moved to the extended position, the door of the receptacle cannot be fully opened.

In some embodiments, the item receptacle further comprises a resilient element connected to the inner tube, wherein the resilient element is moveable between a designated preload and an emergency compressed position, and wherein the resilient element is in the emergency compressed position when the at least one pawl is engaged with the at least one aperture of the outer tube and the inner tube is moved toward the second position within the outer tube.

In another aspect described herein, a method of operating a retraceable arm comprises disposing an inner tube at least partially within a channel of an outer tube at a first, retracted, position, the inner tube having a pawl rotatably connected thereto and the outer tube having a first opening formed therein proximate to a first end of the outer tube and a second opening formed therein proximate to a second end of the outer tube, and having a plurality of apertures formed therein between the first and second openings; moving a first portion of the inner tube out of the outer tube to an intermediate position thereby rotating the pawl into the outer tube; and moving a second portion of the inner tube out of the outer tube to a second, extended position so that the pawl rotates out of the outer tube to partially extend through the second opening.

In another aspect, a retractable arm includes an inner tube, at least one pawl pivotably attached to the inner tube, and an outer tube surrounding the inner tube comprising at least one slot, wherein the inner tube slides into the outer tube into a retracted position, and wherein the inner tube slides out of the outer tube into an extended position, and wherein the at least one pawl locks into the at least one slot of the outer tube preventing the retractable arm from moving into an extended position once the inner tube is pushed inside the outer tube in the direction of the retracted position.

In some embodiments a retractable arm includes an emergency compression spring, wherein the emergency compression spring can be in a compressed position to a designated preload and an emergency compressed position, wherein the emergency compression spring is in the compressed position when the at least one pawl is locked into the at least one slot of the outer tube and the inner tube is pulled towards the extended position. In some embodiments the emergency compression spring is helical.

In some embodiments of the retractable arm, the pawl is pivotably attached to the inner tube and comprises a rounded edge and a squared edge, wherein the rounded edge is wider than the squared edge. In some embodiments, the squared edge of the pawl locks into the at least one slot of the outer tube. In some embodiments, the rounded edge of the pawl is too wide to fit into the at least one slot of the outer tube and, therefore, slides over the slot.

In some embodiments, the retractable arm is secured to a door disposed within a housing comprising a top edge and a bottom edge and rotatable about an axis from at least a first closed position to a second open position, wherein the retractable arm is in the retracted position when the door is in the first closed position and the extended position when the door is in the second open position, wherein the retractable arm must be in the retracted position before the door will rotate to the second open position. In some embodiments, there is a first cutting edge disposed within the housing. In some embodiments, there is a second cutting edge disposed within the housing. In some embodiments there is a rake with a back edge and a front edge, where the rake is secured within the housing at the bottom edge of the door and where the first cutting edge is on the front edge of the rake configured to move underneath a stopper when the door is in the second open position to receive mail. The back edge of the rake comprises at least one bolt configured to move between at least one slot in the stopper to allow the rake to move all the way behind the stopper and to allow the door to be in the second open position.

In some embodiments, the bottom edge of the door comprises a cutting edge.

In another aspect, a device for preventing damage of an item inserted into a receptacle is described. The device includes a housing having an opening for receiving items, a door configured to pivot about a pivot point from a closed position to an open position, a retractable arm coupled to the door and configured to be in a retracted position when the door is closed and an extended position when the door is open, where the retractable arm must be in the retracted position before the door will open further.

In some embodiments the retractable arm includes an inner tube comprising at least one pawl and an outer tube, where the inner tube is configured to be inserted into the outer tube and the outer tube comprises at least one slot, where the pawl(s) of the inner tube lock into the slot(s) of the outer tube holding the retractable arm in at least one locked position and preventing the retractable arm from moving further into the extended position. This prevents the door from opening further and requires that the door be shut completely prior to being opened again.

In some embodiments the retractable arm includes an emergency compression spring, where the emergency compression spring is configured to allow the door a minimal opening from the first closed position and/or a minimal amount of movement from the at least one locked position(s).

In some embodiments the device includes a rake coupled to the bottom edge of the door, where the rake includes a bottom plate and a top plate, where the bottom plate and the top plate are secured by at least one bolt.

In some embodiments the rake includes at least one cutting edge.

In some embodiments, the device includes a stop, where the bottom plate of the rake is configured slide underneath the stop and the top plate of the rake is configured to slide on top of the stop when the door is in the second open position. This allows mail to enter the device without getting cut by the cutting edge of the rake.

In some embodiments the stop includes at least one cutting edge.

In another aspect, a method of preventing damage of an item placed in a receptacle is described. The method includes receiving an item from a user at an item receptacle through a door and preventing reopening of the door until the door is fully closed and the item is safely in a collection container, where there is at least one cutting edge within the item receptacle that would damage or tear the item if the door did not fully close.

In another aspect, a receptacle for items includes a housing with an opening for receiving items, a door within the housing includes a top edge and a bottom edge and the door rotates around an axis from a closed position to an open position. The receptacle also includes a retractable arm secured to the door, where the retractable arm is in a retracted position when the door is closed and moves to an extended position when the door is open. In between the extended position and the retracted position, the retractable arm includes at least one and preferably more than one, locked positions. The retractable arm must be in the retracted position before the door will open.

In some embodiments the retractable arm includes an inner tube with at least one pawl and an outer tube surrounding the inner tube with at least one slot and preferably several slots. If the door begins to shut, the pawl(s) of the inner tube lock(s) into the slot(s) of the outer tube holding the retractable arm into at least one locked position and preventing the retractable arm from moving into the extended position, thus, preventing the door from opening further until the door reaches the closed position.

In some embodiments the retractable arm includes an emergency compression spring, where the emergency compression spring can be in a compressed position to a designated preload and in an emergency compressed position, where the emergency compression spring is in the compressed position when the retractable arm is in a locked position and the door opens slightly. In some embodiments the emergency compression spring is helical.

In some embodiments the receptacle has a cutting edge disposed within the housing. In some embodiments the cutting edge is on the door. In some embodiments the cutting edge is on the bottom edge of the door. In some embodiments, there is a second cutting edge disposed with in the housing. In some embodiments the second cutting edge is configured to abut against the first cutting edge.

BRIEF DESCRIPTION OF THE DRAWINGS

The foregoing and other features of the disclosure will become more fully apparent from the following description and appended claims, taken in conjunction with the accompanying drawings. The drawings disclose illustrative embodiments and particularly an illustrative implementation in the context of an official United States Postal Service (USPS) mailbox. They do not set forth all embodiments. Conversely, some embodiments are practiced without all of the details that are disclosed. It is to be noted that the figures provided herein are not drawn to any particular proportion or scale.

DETAILED DESCRIPTION

Figure 1:
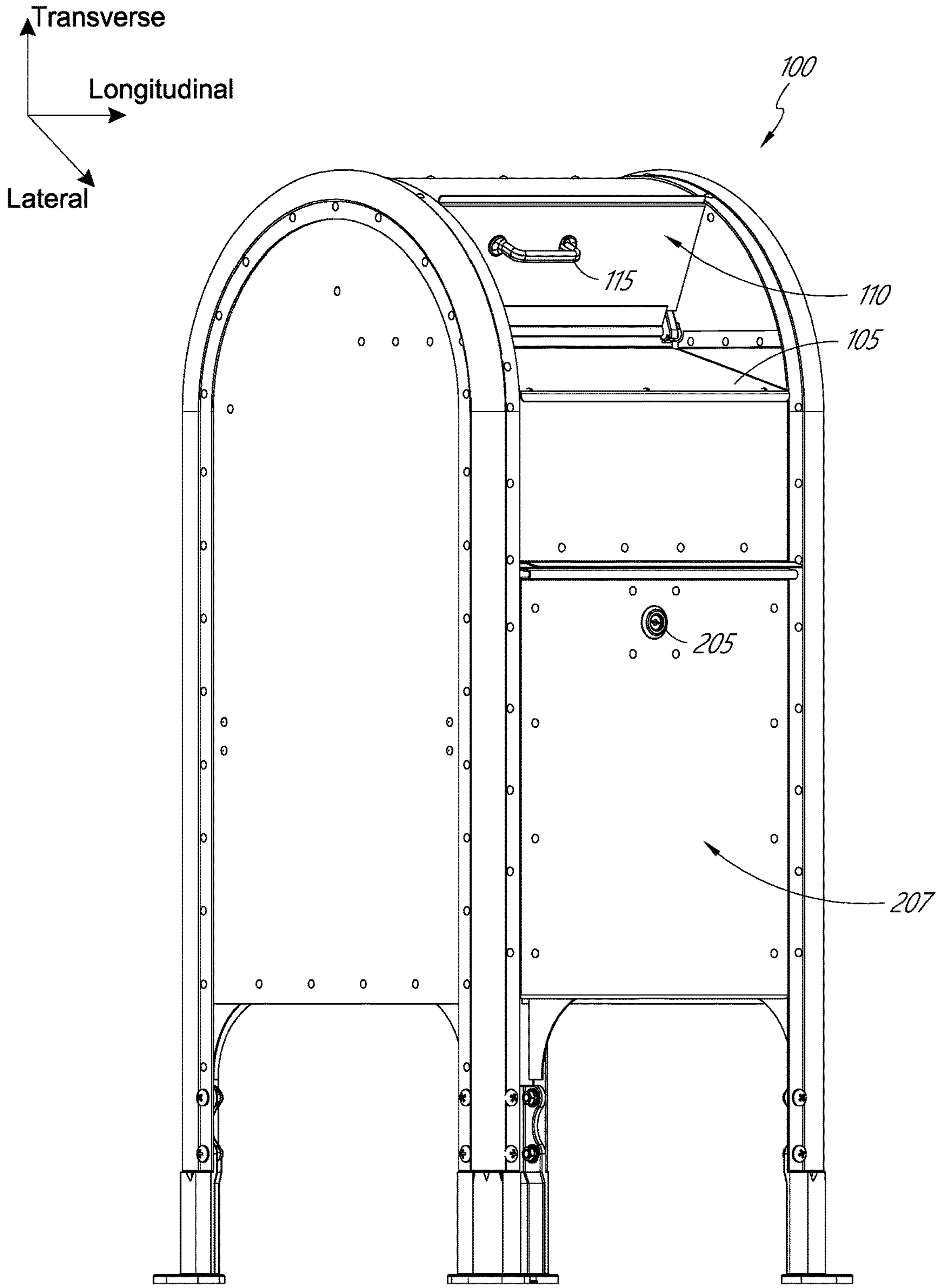
FIG. 1 is a perspective view of an item receptacle according to an example implementation.

In the following detailed description, reference is made to the accompanying drawings. In the drawings, similar symbols typically identify similar components, unless context dictates otherwise. Thus, in some embodiments, part numbers are used for similar components in multiple figures. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which are exhibited by some embodiments and not by others. Similarly, various requirements are described which are requirements for some embodiments but are not requirements for other embodiments.

The following description and examples illustrate preferred implementations of various devices, systems, and methods for preventing tearing of a deposited item. In general, an item receptacle may be modified to include a retractable arm. If the door of an item receptacle is reopened after mail has deposited, and before the door has closed completely, the mail may get caught, stuck, ripped, or torn on internal components of the item receptacle. The retractable arm will prevent the door from being re-opened after being partially closed, which may cause damage or tearing of the deposited items due internal features of the receptacle. Rather, once a user deposits an item, due to the presence of the retractable arm, the door must be shut completely before it can be opened again. To this end, the retractable arm may also have a resilient element, such as a spring, to allow the user to slightly open a partially closed door in order to remove hands or fingers before shutting the door completely.

Particular implementations of the subject matter described in this disclosure can be implemented to realize one or more of the following potential advantages. The embodiments described herein provide a retractable arm with a locking mechanism to prevent reopening of a door that has not been fully closed. This implementation can realize a safe and reliable solution for preventing damage to items placed in an item receptacle. The device may be installed in already existing receptacles, thus reducing costs. The device is also safe for use by the general public.

Turning to FIG. 1, an item receptacle 100 is used as an example implementation to illustrate the embodiments disclosed. The item receptacle 100 in the example implementation, includes a front plate 105 and a pivoting door 110. Users can open the pivoting door 110, by rotating the pivoting door 110 towards the front plate 105 and depositing an item therein. The item receptacle 100 includes a bin door 207 that is locked in a closed position with a lock 205. A delivery person can unlock the bin door 207 via the lock 205 and remove the item deposited therein.

To assist in the description of the disclosed aspects and embodiments, the following coordinate terms are used (see, e.g., FIG. 1). A "longitudinal axis" is generally parallel to a portion of the item receptacle 100 that extends along the elongated side of the item receptacle on which the pivoting door 110 is disposed. A "lateral axis" is normal to the longitudinal axis. A "transverse axis" extends normal to both the longitudinal and lateral axes. The "transverse axis" is also referred to as the "vertical axis." If the transverse axis referred to extends in the same direction as a gravitational force, then the transverse axis is referred to herein as gravity. In addition, as used herein, "the longitudinal direction" refers to a direction substantially parallel to the longitudinal axis; "the lateral direction" refers to a direction substantially parallel to the lateral axis; and "the transverse direction" or "the vertical direction" refers to a direction substantially parallel to the transverse axis.

The terms "upper," "under," "below," "lower," "top," "bottom," "underside," "upperside," and the like, which also are used to describe the item receptacle 100, are used in reference to the illustrated orientation of the embodiment. For example, as shown in FIG. 1, the bin door 207 is located in a position that is below the pivoting door 110.

Figure 2:
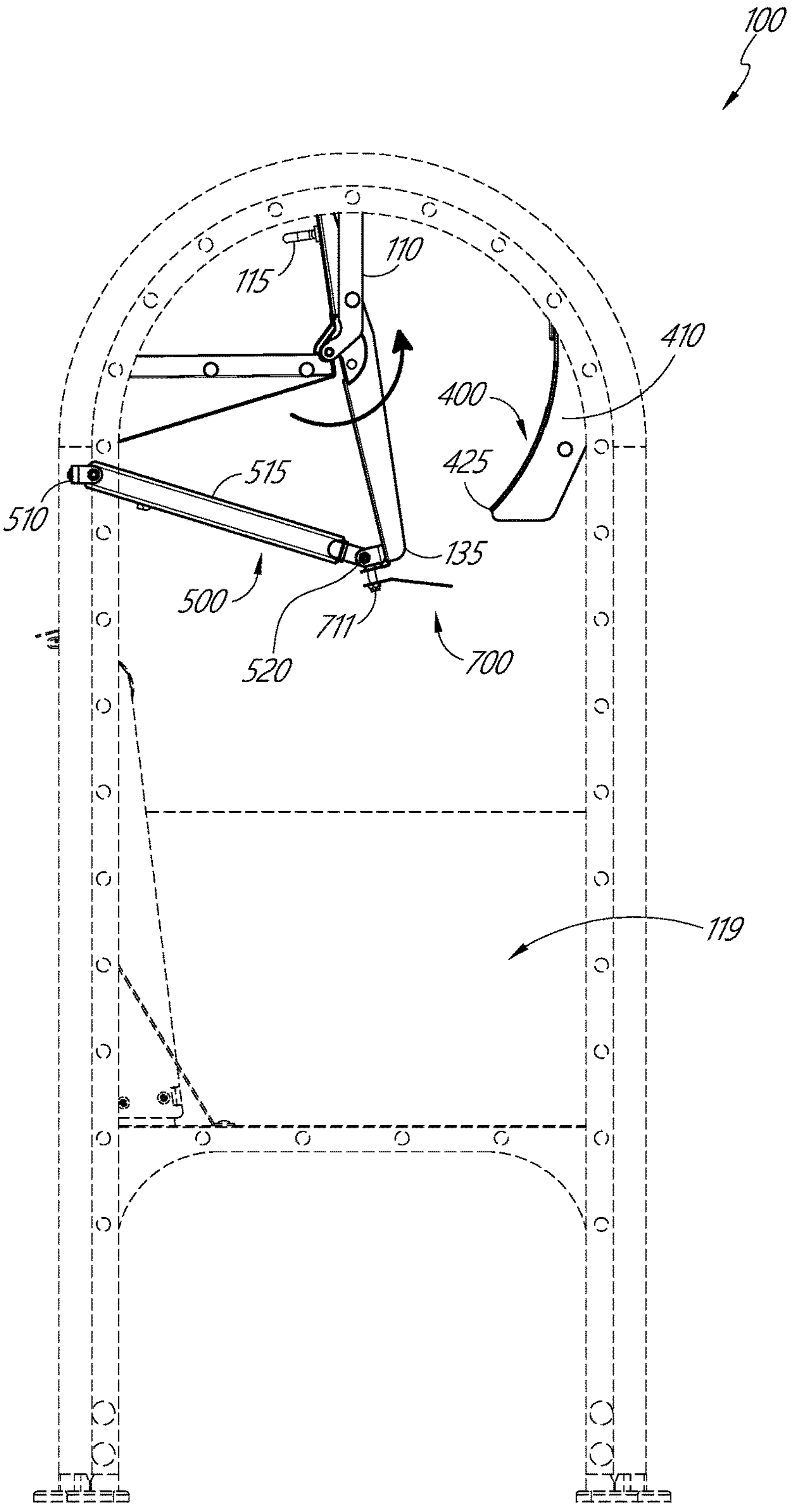
FIG. 2 is a cross-sectional side view of an item receptacle according to an example implementation, with the receptacle shown in dashed lines for ease of illustration.

FIG. 2 illustrates example implementations of the retractable arm 500 within the item receptacle 100 where the item receptacle contains devices for preventing damage to items placed in the receptacle 100. The retractable arm 500 comprises a body 515, a first attaching mechanism 510 and a second attaching mechanism 520. The first attaching mechanism 510 is attached to the inside surface or component of the item receptacle 100. The second attaching mechanism 520 is attached to the pivoting door 110 at a lower portion of the door 110 at a point within the volume of the receptacle 100, generally at an end of the door 110 opposite the handle. The second attaching mechanism 520 is any type of attaching mechanism such as a weld, rivet, screw, bolt, and the like. In some embodiments, the second attaching mechanism comprises a pivot member, such as a rod extending parallel to the door 110 and perpendicular to the length of the retractable arm 500. This allows the door 110 and the retractable arm 500 to be connected, and as the door 110 pivots, the retractable arm 500 can move with the pivoting door without the second attaching mechanism 520 breaking from the door. The pivoting door 110 includes a bottom edge 135.

A stopper 400 is positioned within the item receptacle 100. The stopper 400 includes a ramp 410. The ramp 410 directs items deposited within the opening into the bin 200. In one embodiment, the stopper 400 includes a cutting edge 425 formed along an edge of the stopper 400 closest to the door 110. The cutting edge 425 can be jagged and/or serrated and/or sharpened.

Figure 5:
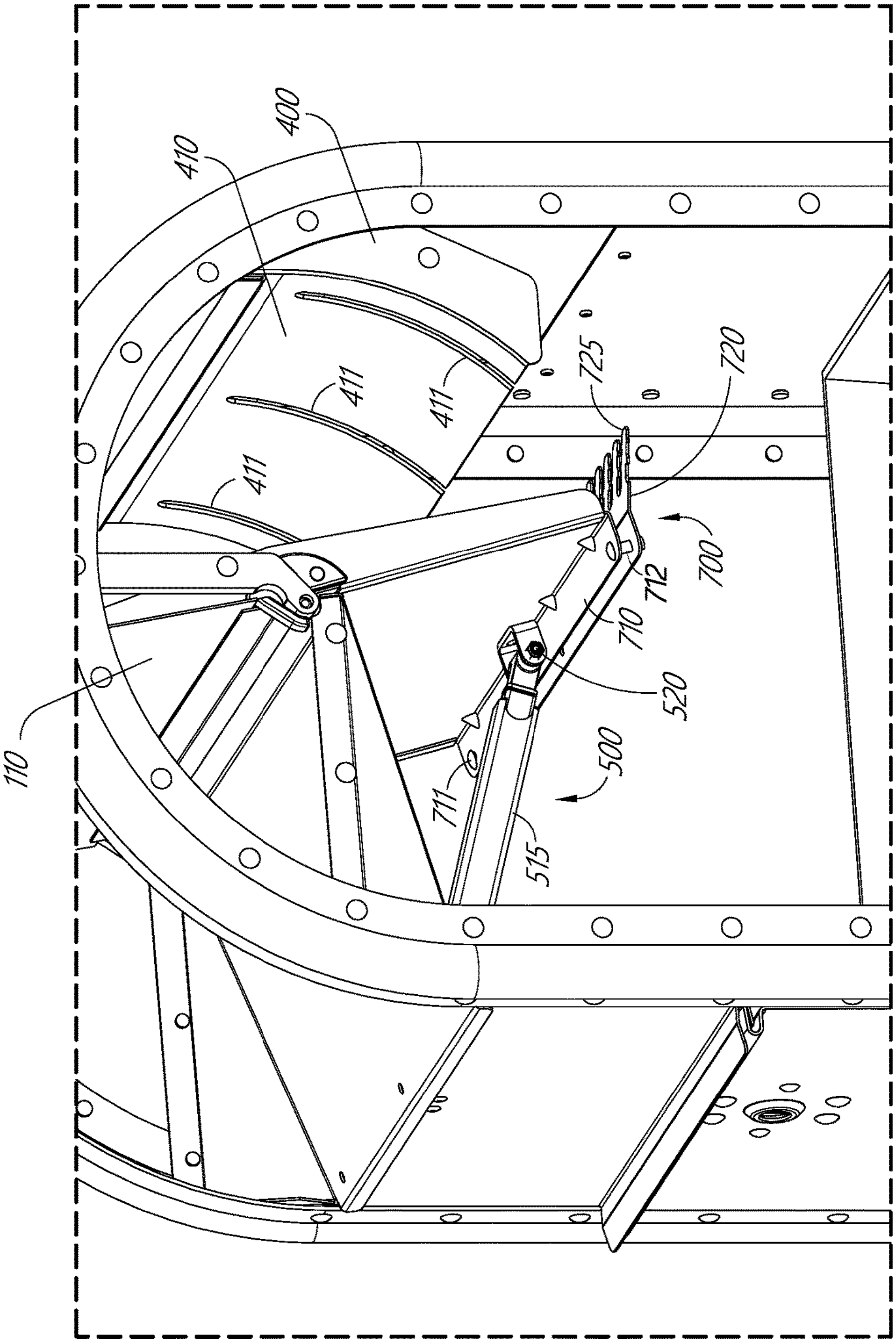
FIG. 5 is an enlarged perspective view of an item receptacle used with the retractable arm according to an example implementation.

A rake 700 is positioned on the bottom edge 135 of the door 110. The rake 700 is disposed within the item receptacle 100, as depicted in FIGS. 2 and 5. The rake 700 comprises attaching mechanism 711 can be a bolt, screw, rivet, weld, or other similar attachment device and will be described in greater detail with regard to FIG. 5.

The bin 200 is located below the stopper 400 and the door 110. The bin 200 can be removed from the item receptacle 100 for facilitating the removal of items deposited into the item receptacle 100.

Figure 3:
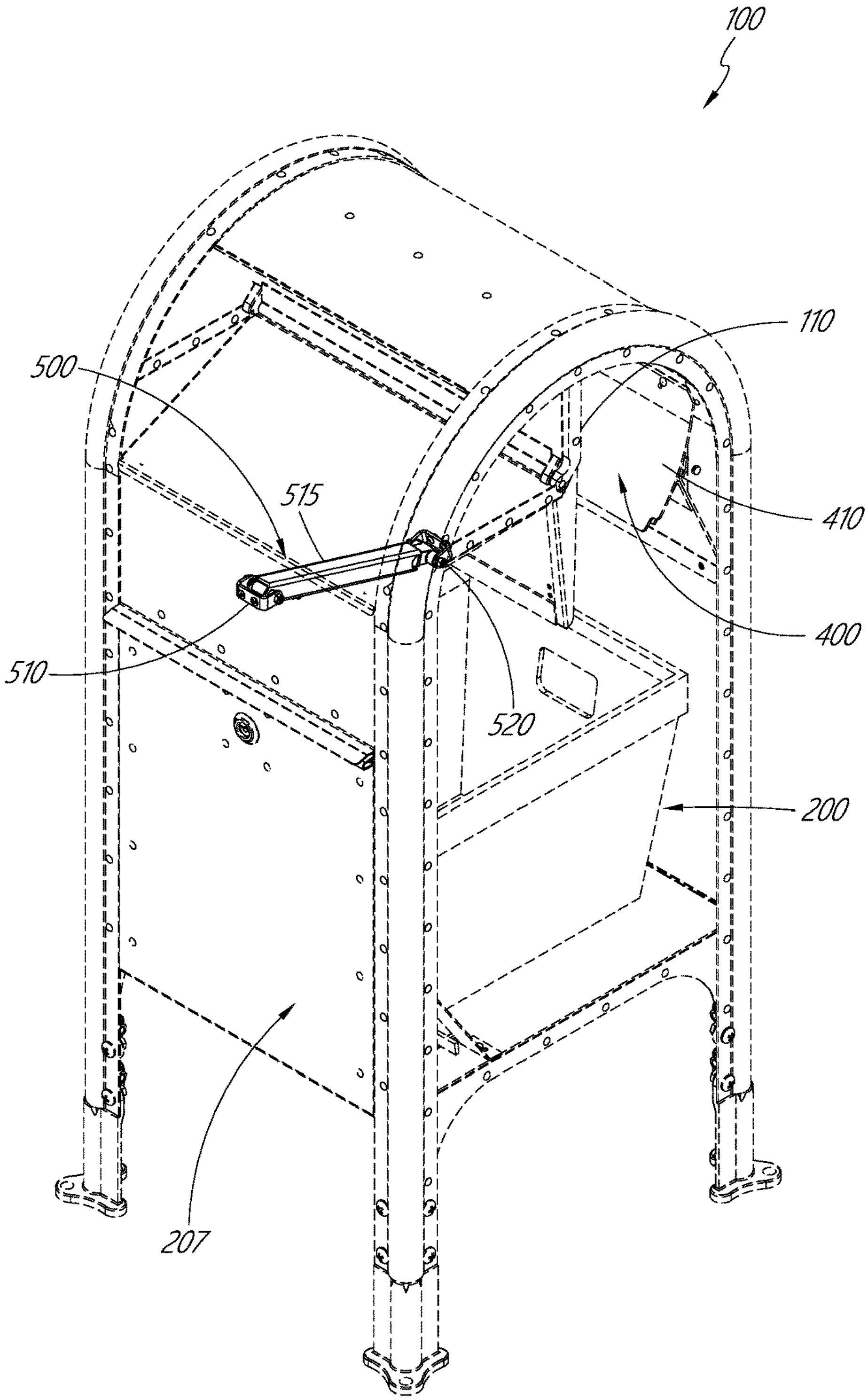
FIG. 3 is a perspective view of an item receptacle according to an example implementation with a portion of the exterior cover of the item receptacle removed showing the attachment location of the retractable arm, and the receptacle shown in dashed lines for ease of illustration.

FIG. 3 is a perspective view of an item receptacle with a portion of the exterior cover of the item receptacle 100 removed showing the attachment location of the retractable arm 500, and the item receptacle 100 shown in dashed lines for ease of illustration. FIG. 3 shows that the first attachment mechanism 510 can attach the body 515 of the retractable arm 500 to an upper interior surface of the item receptacle. In FIG. 3, the surface to which the first attachment mechanism 510 is attached is shown transparent for ease of illustration.

Figure 4:
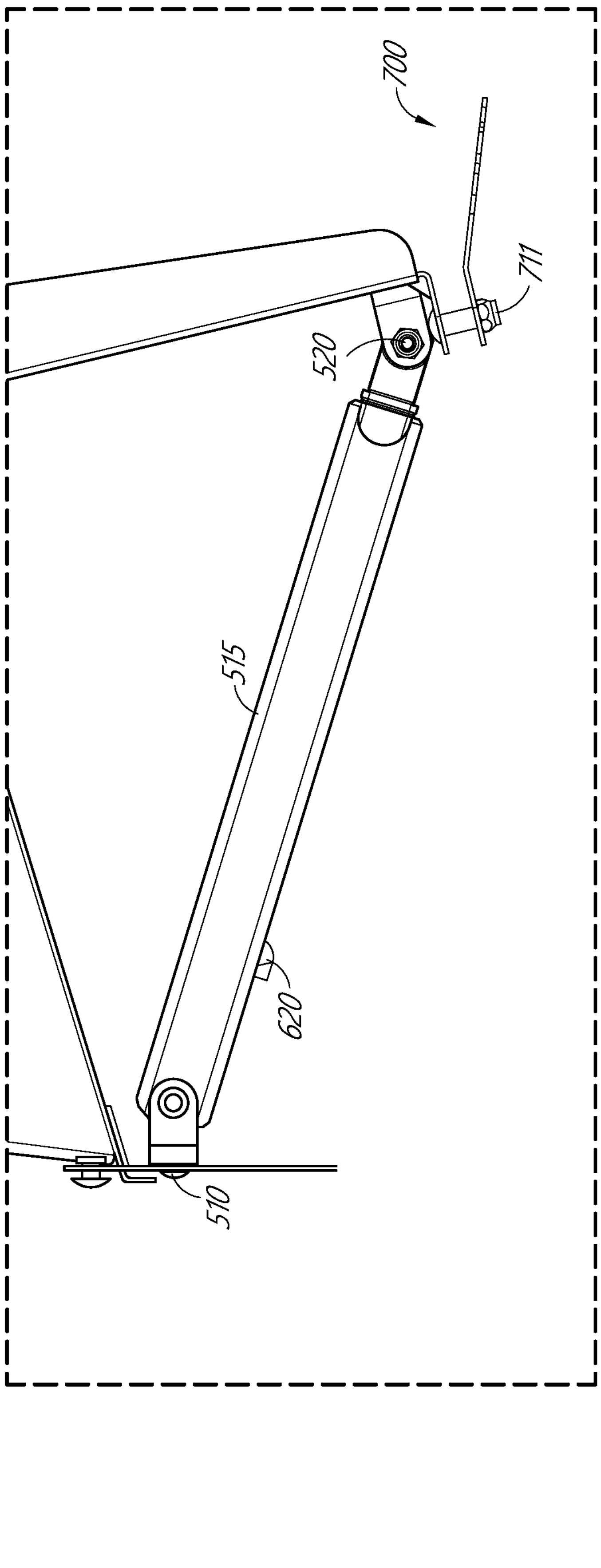
FIG. 4 is an enlarged side view of an embodiment of the retractable arm.

FIG. 4 illustrates an enlarged view of an example of the retractable arm 500 as shown in FIGS. 2 and 3 in the retracted position. The retractable arm comprises a body 515, a first attaching mechanism 510 configured to be attached to the inside of the receptacle 100 and a second attaching mechanism 520 configured to be attached to a surface of the door 110 inside of the receptacle 100. As shown, the second attachment mechanism 520 is pivotable around a point to enable the retractable arm 500 to move relative to the door 100 as the door 100 is moved.

FIG. 5 depicts exemplary features of the stopper 400 within the item receptacle 100. The ramp 410 of the stopper 400 is formed having one or more grooves 411 therein. The grooves extend from the cutting edge 425, where they have an opening, along the surface of the ramp 410.

FIG. 5 further depicts exemplary features of the rake 700. The rake 700 includes a top piece 710 and a bottom piece 720, where the top piece 710 is attached to the door 110 by L-brackets or the like generally at the bottom edge 135 of the door 110 parallel to the handle. The bottom piece 720 is attached to the top piece 710 by the attaching mechanism 711.

In some embodiments, the attaching mechanism 711 connects the top piece 710 to the bottom piece 720 so as to create a separation between the top piece 710 and the bottom piece 720. A shaft 712 of the attaching mechanism 711 extends between the top piece 710 and the bottom piece 720 in a direction perpendicular to the planar surfaces of the top and bottom pieces 710, 720. The bottom piece 720 also includes a cutting edge 725. The cutting edge 725 of the bottom piece 720 of the rake 700 can be jagged and/or serrated and/or sharpened. The shape, size, and combinations of materials used for the cutting edge are not limited to the foregoing, but are selected for specific characteristics.

As the door 110 is moved, the rake 700 moves in the same direction as the bottom edge 135 of the door 110. To enable the rake 700 to move along the ramp 410, the at least one attaching mechanism 711 of the rake 700 is aligned with one of the one or more grooves 411 formed in the ramp 410. The shaft 712 of the at least one attaching mechanism 711 is positioned to be inserted into and move in the at least one groove 411. In operation, the bottom piece 720 of the rake 700 moves on one side of the ramp 410 and the top piece 710 of the rake 700 moves on the other side of the ramp 410 as the door 110 is opened.

In operation, a user grabs the handle 115 of the pivoting door 110, pivoting the pivoting door 110 into at least a partially open position. When the pivoting door 110 is pivoted into a partially open position, the retractable arm 500 is extended into a partially extended position (See FIGS. 7, 17, and 21). If the pivoting door 110 is pivoted into the fully open position, then the retractable arm 500 is extended into a fully extended position (See FIGS. 8, 18, and 22). The user then places an item within the item receptacle 100. Items can be placed, for example, on the rear side of the pivoting door 110. Release of the handle 115 causes the pivoting door 110 to return to the first closed position shown in FIGS. 1 and 20. As the pivoting door 110 is returned to the closed position, the retractable arm 500 is returned to the retracted position (See FIGS. 6 and 16) and the item slides down along the pivoting door 110, contact the ramp 410 and move into the collection area 119 and/or bin 200.

Figure 6:
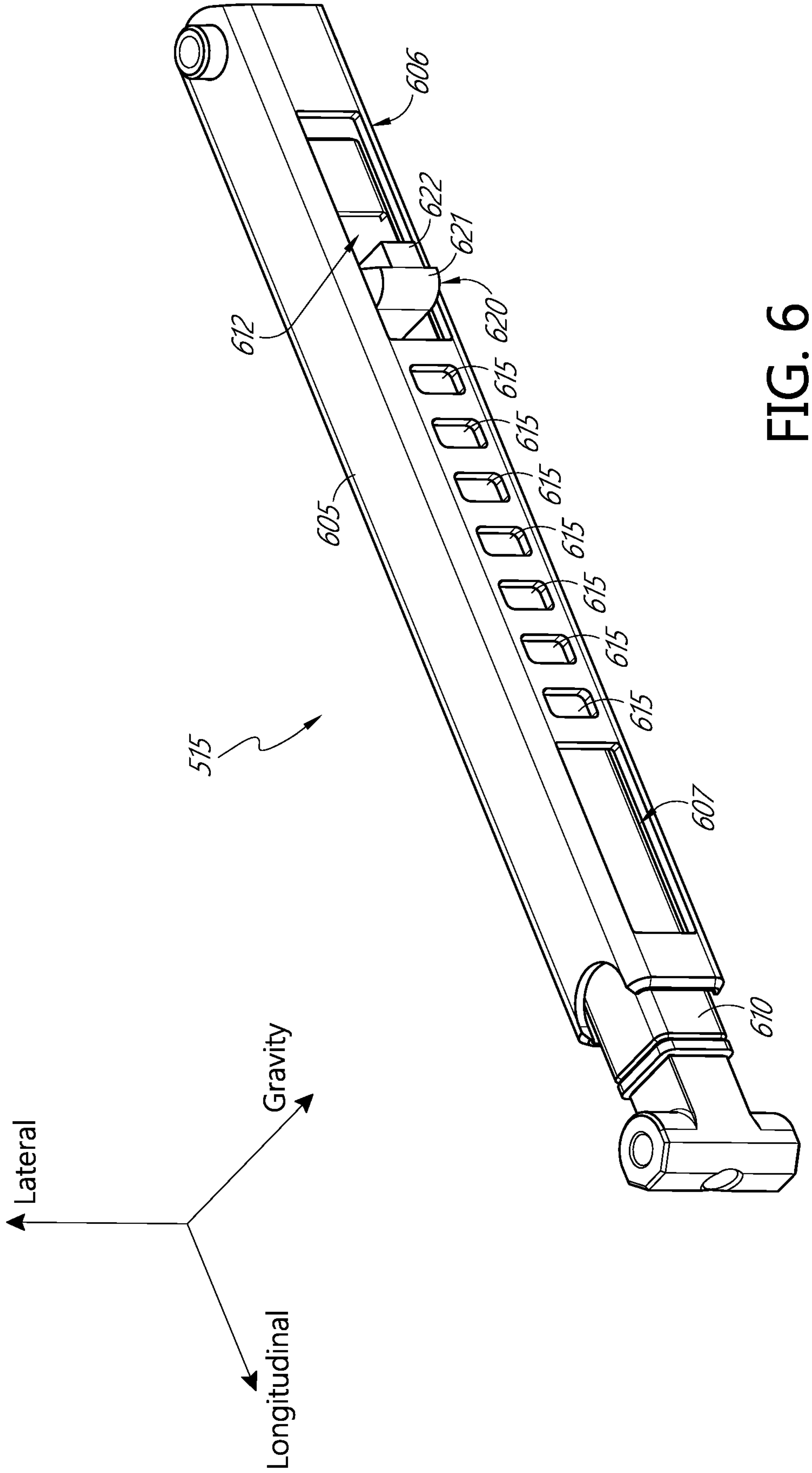
FIG. 6 is a perspective view of an embodiment of the retractable arm showing the underside of the retractable arm in the retracted position.

FIGS. 6-13 illustrate exemplary features of the body 515 of the retractable arm 500. Turning to FIG. 6, the body of the retractable arm comprises an inner tube 610 and an outer tube 605. The inner tube 610 is sized and shaped to slide inside the outer tube 605. The inner tube 610 comprises an opening 612 extending along a portion of one side of the inner tube 610.

A pawl 620 is disposed within the opening 612, such that the pawl can project transverse from the inner tube 610. The pawl 620 is attached to the inner tube 610 via a pivoting or rotating connection. The pawl 620 is configured to rotate about a lateral axis extending through the inner tube 610 and parallel to the opening 612, along a width or height of the inner tube 610. The pawl 620 has a hole therethrough which receives a pin that extends perpendicular to the long axis of the inner tube 610, and which is fixedly attached to internal surfaces of the inner tube 610. The pawl 620 can thus be retained at least partially within the inner tube 610, while being able to rotate about an axis extending through the pin, which is perpendicular to the long dimension of the inner tube 610. The pawl 620 is an elongate member and comprises a smooth or curved surface 621 to allow the pawl 620 to easily slide across a plurality of slots 615 in the outer tube 605 as the inner tube 610 is sliding out of the outer tube 605, as will be described in greater detail below. The pawl 620 comprises an edge 622 disposed at the same end of the pawl 620 as the curved surface 621, but on an opposing side of the pawl 620. The pawl 620 is elongate and attached within the inner tube 610 such that the pawl, when shown in a first position (as in FIG. 6), a portion of the pawl 620 extends through the opening 612 in the inner tube 610. When the pawl 620 is in a second, rotated position (as shown in FIG. 7) the pawl 620 is located completely or substantially within the inner tube 610.

The outer tube 605 is shaped to be larger than the inner tube 610, and is sized to receive the inner tube 610. The outer tube comprises a first opening 606, a series of slots 615 formed along a portion of a side of the outer tube 615, and a second opening 607. The slots 615 can be rectangular voids in the side of the outer tube 605 spaced at regular intervals along the outer tube 605 between the first and second openings 606, 607. The slots 615 can be sized to receive a portion of the edge 622 of the pawl 620. The first and second openings 606, 607 are formed in the same surface of the outer tube 605 as the slots 615, and are sized and shaped to receive the pawl 620 as it rotates within the inner tube 610, as will be described in greater detail below.

Figure 7:
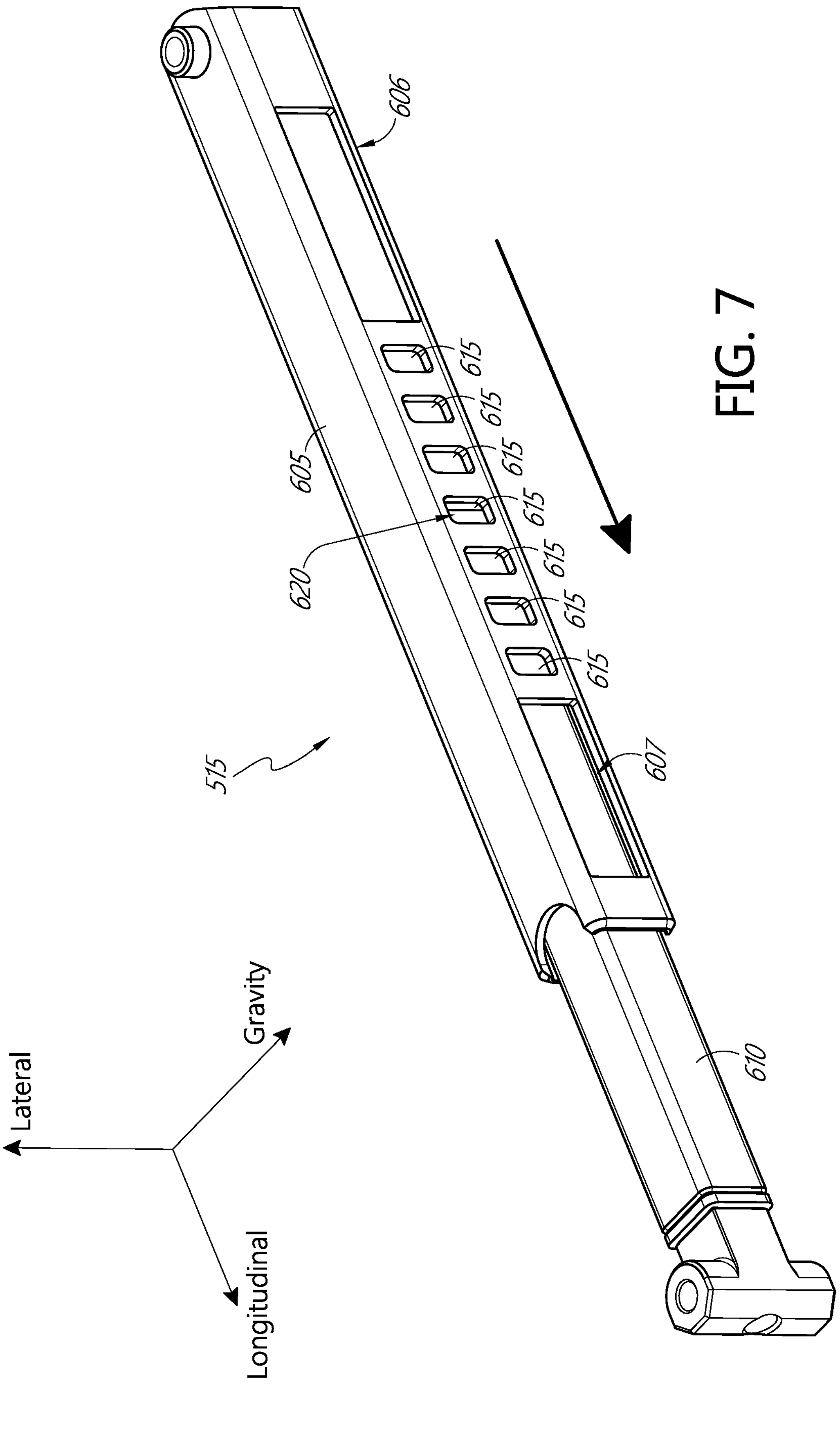
FIG. 7 is a perspective view of an embodiment of the retractable arm showing the underside of the retractable arm in a partially extended position moving from a retracted position towards an extended position.

FIG. 7 shows the inner tube 610 extended partially from the outer tube 605, extending from the retracted position shown in FIG. 6. The shape and rotatable connection of the pawl 620 to the pin or bar within the inner tube 610 allow the pawl to rotate. As the inner tube 610 is retracted, the curved surface 622 pawl 620 contacts a rim of the first opening 606, which causes the pawl 620 to rotate within the inner tube 610. As depicted, the pawl 620 is in a rotated position within the inner tube 610.

Figure 8:
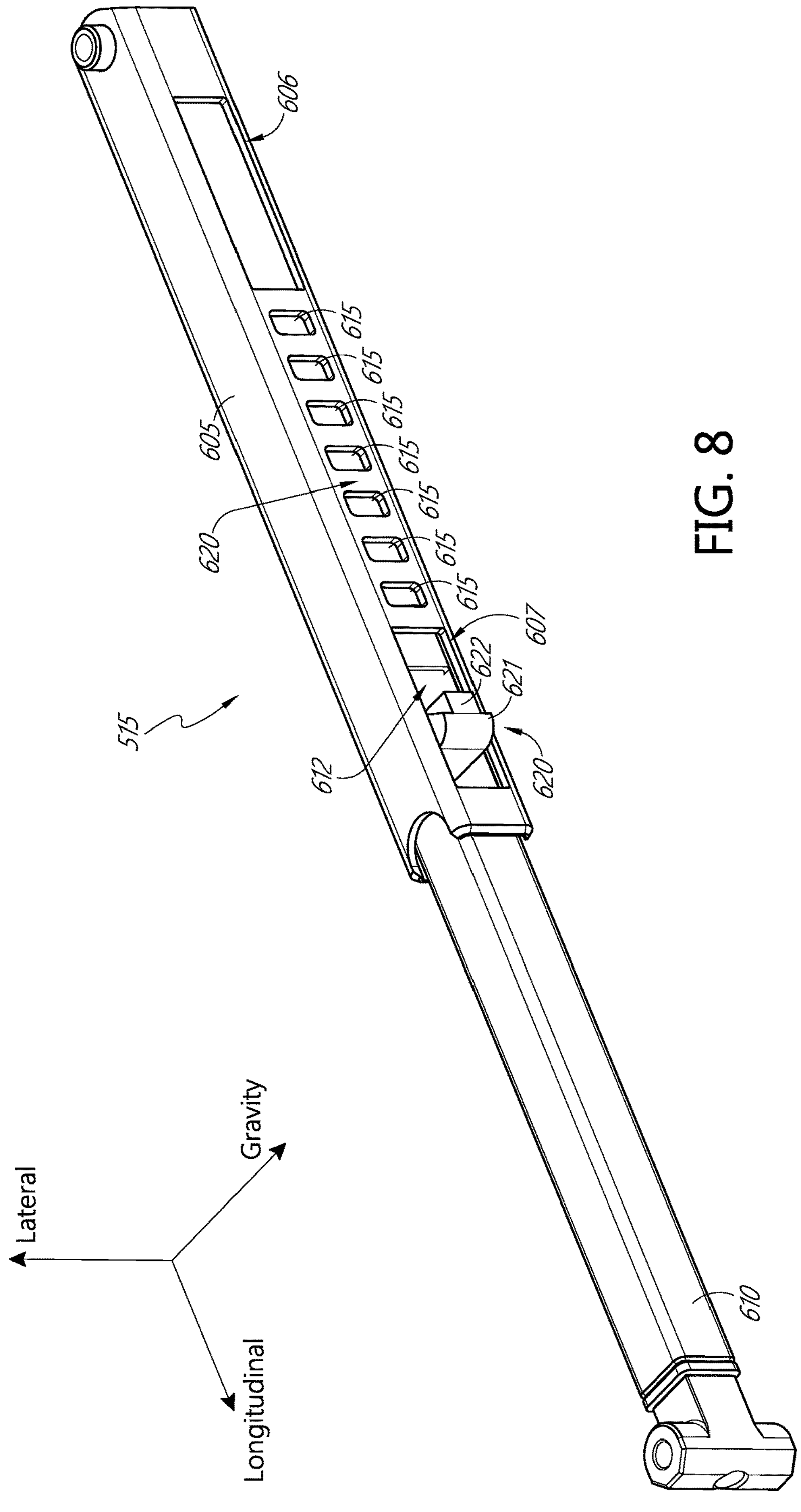
FIG. 8 is a perspective view of an embodiment of the retractable arm showing the underside of the retractable arm in the fully extended position

The pawl 620 slides along the inner surface of the outer tube 605 as the inner tube is retracted. FIG. 8 depicts the inner tube 610 in an extended position. As the inner tube 610 is retracted, the pawl 620 moves to the second opening 607, wherein the pawl 620 is no longer in contact with the inner surface of the outer tube 605, and gravity causes the pawl 620 to rotate down such that the curved surface 621 and the edge 622 protrude through the second opening 607 as shown in FIG. 8.

Figure 9:
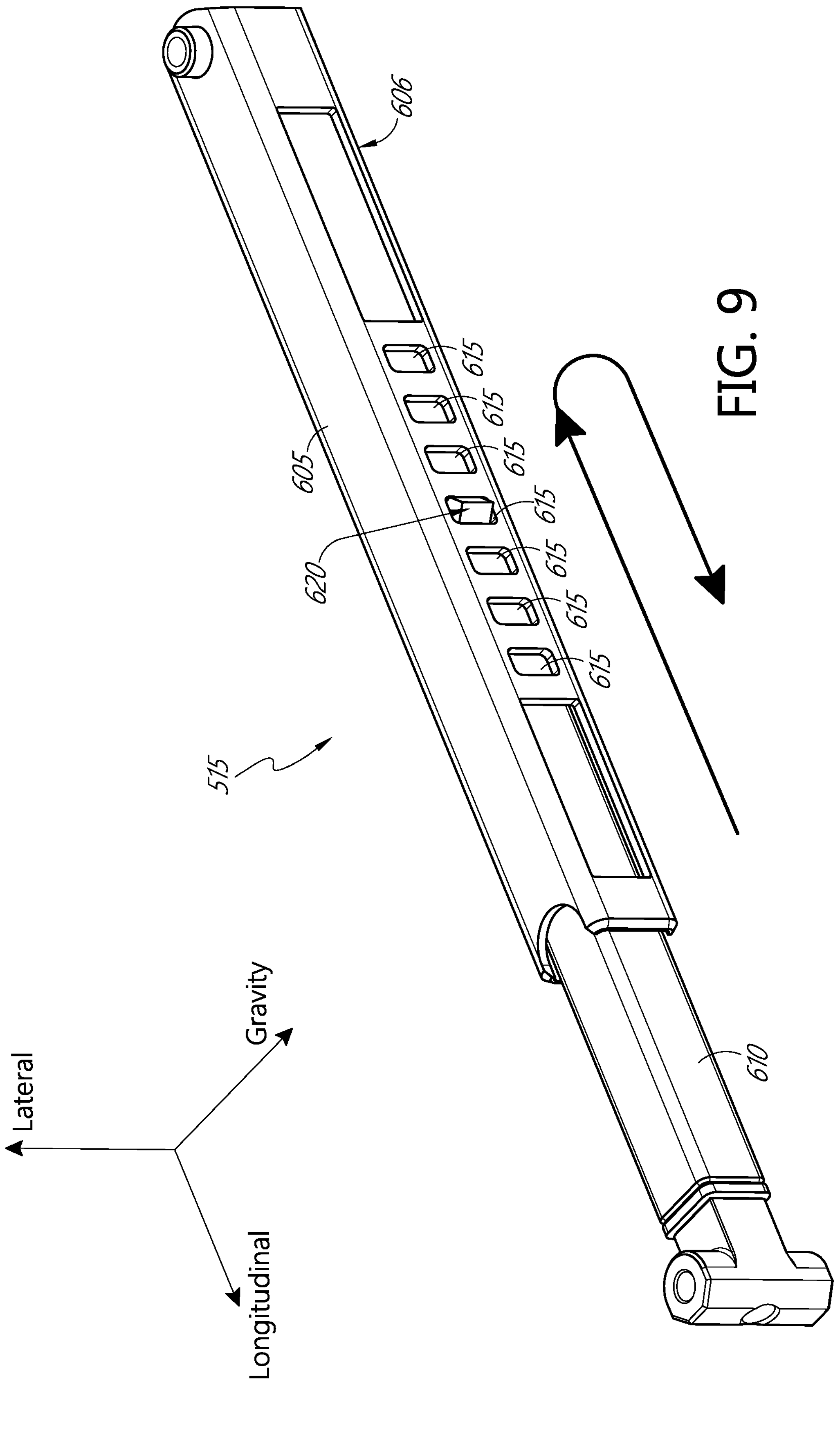
FIG. 9 is a perspective view of an embodiment of the retractable arm showing the underside of the retractable arm in a partially extended position moving from an extended position towards a retracted position.

FIG. 9 depicts the inner tube 610 being moved back into the outer tube 605. The curved arrow indicates that while moving towards a retracted position, sudden change of the motion towards an extended position, motion is prevented by the pawl that becomes engaged with at least one slot of the outer tube. As the inner tube 610 is moved back into the outer tube 605, such as when the door of the item receptacle is closed, the edge 622 of the pawl contacts a rim of the second opening, causing the pawl 620 to rotate into the inner tube 610. The direction of rotation of the pawl 620 on reinsertion of the inner tube 610 is opposite the direction of rotation of the pawl when the inner tube 610 is withdrawn from the outer tube 605. As the pawl 620 moves through the outer tube 620, the edge 620 extends through the series of slots 615. Because the pawl 620, via the edge 622, locks into one of the slots of 615, the inner tube 610 is prevented from moving back out of the outer tube 605. The inner dimensions of the inner tube 610 and the dimensions of the pawl 620 prevent the pawl 620 from rotating within the inner tube 610. The engagement of the at least one pawl 620 in the at least one slot 615 of the outer tube 605 allows the inner tube 610 to slide further inside the outer tube 605 towards the retracted position but prevents the inner tube 610 from sliding back out of the outer tube 605 towards the extended position. Before the inner tube 610 can be moved back out of the outer tube 605, the inner tube 610 must be moved far enough into the outer tube 605 to allow the pawl 620 to again rotate down, e.g. due to gravity, through the first opening 606. This prevents the door of the item receptacle from being reopened before the door has been completely closed.

The inner tube 610 and the outer tube 605 can be square, cylindrical, triangular, or any other shape that allows the inner tube 610 to slide inside the outer tube 605. The inner tube 610 and the outer tube 605 can be steel or other materials that will withstand heavy use. The shape, size, and materials used for the inner tube 610 and the outer tube 605 are not limited to those recited, but are selected for specific characteristics, including the ability of the inner tube to slide in and out of the outer tube with a locking mechanism that prevents the inner tube 610 from sliding back out of the outer tube 605 until both tubes are in the fully retracted position and the ability of the inner tube 610 and the outer tube 605 to withstand heavy use.

The at least one pawl 620 is a pivoting pawl and can be made from stainless steel, flat, annealed, and pickled. The shape, size, and materials used for the pawl(s) 620 are not limited to those recited, but are selected for specific characteristics, including the ability of the pawl(s) 620 to act as a locking mechanism that prevents the inner tube 610 from sliding back out of the outer tube 605 until the retractable arm 500 is in the fully retracted position and the ability of the pawl 620 to withstand heavy use.

The at least one slot 615 is square with rounded corners as shown in FIGS. 6-9 or square with square corners, or triangular, or circular, or any other shape or size that allows the edge of the pawl 622 to fit in the at least one slot 615 and lock the retractable arm 500 preventing it from re-extending until the retractable arm 500 is in the fully retracted position and the door 110 is closed.

Figure 10:
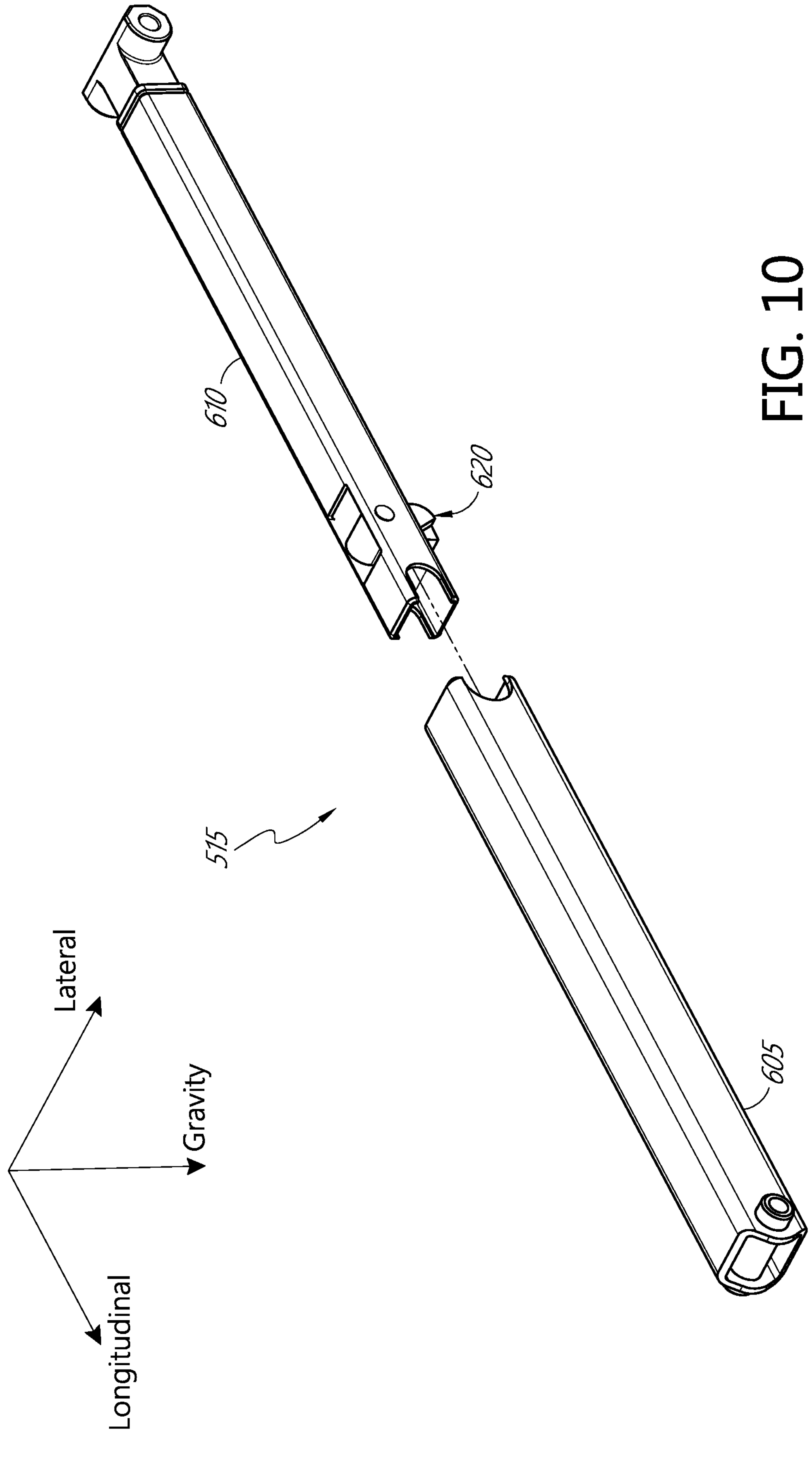
FIG. 10 is a perspective view of an embodiment of the retractable arm showing the inner tube and the outer tube separated.
Figure 11:
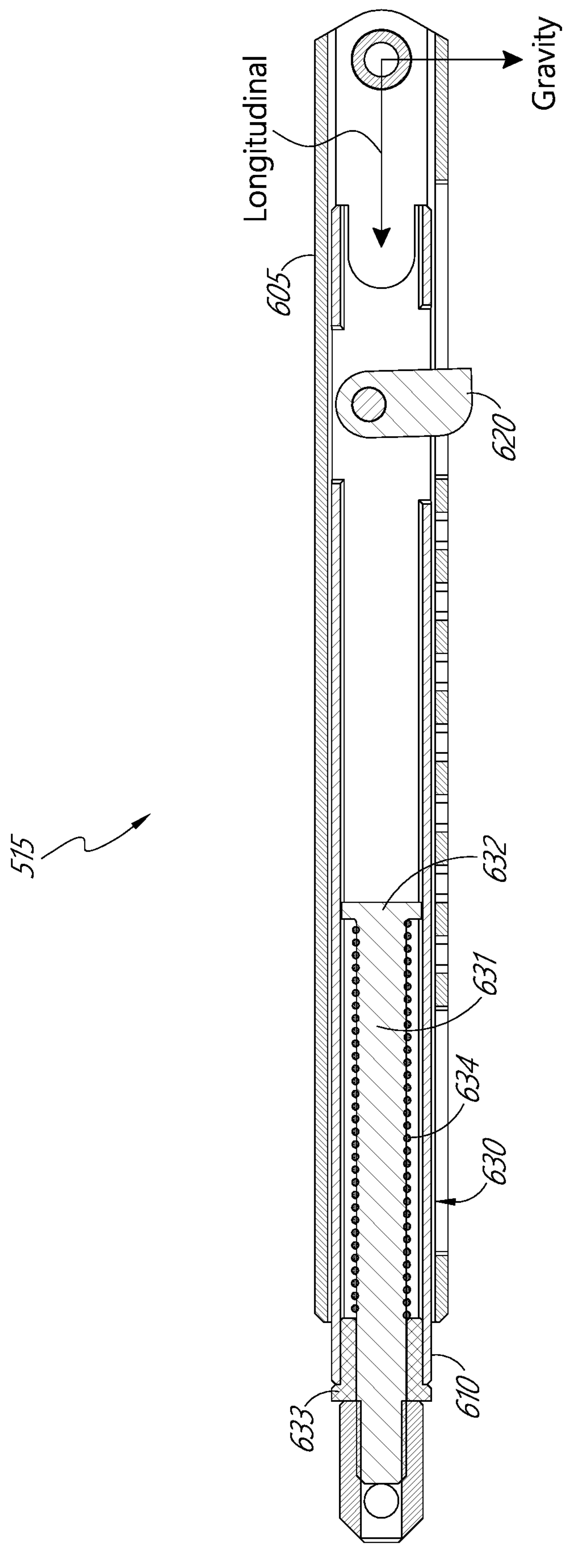
FIG. 11 is a cross-sectional side view of an embodiment of the retractable arm showing the inner tube inside the outer tube.

FIG. 10 illustrates an embodiment of the body 515 of the retractable arm 500 showing the inner tube 610 and the outer tube 605 separated. FIG. 11 illustrates a cross-sectional view of an embodiment of the body 515 of the retractable arm 500 showing the inner tube 610 inside of the outer tube 605. Referring to both FIGS. 10 and 11, the inner tube 610 is configured to fit inside the outer tube 605. The pawl 620 is attached inside the inner tube 610 via a rotating axis and is positioned transverse to the inner tube 610 as a result of gravity. The pawl rotates or pivots about a lateral axis back towards the longitudinal axis or forward towards the longitudinal axis.

Figure 12:
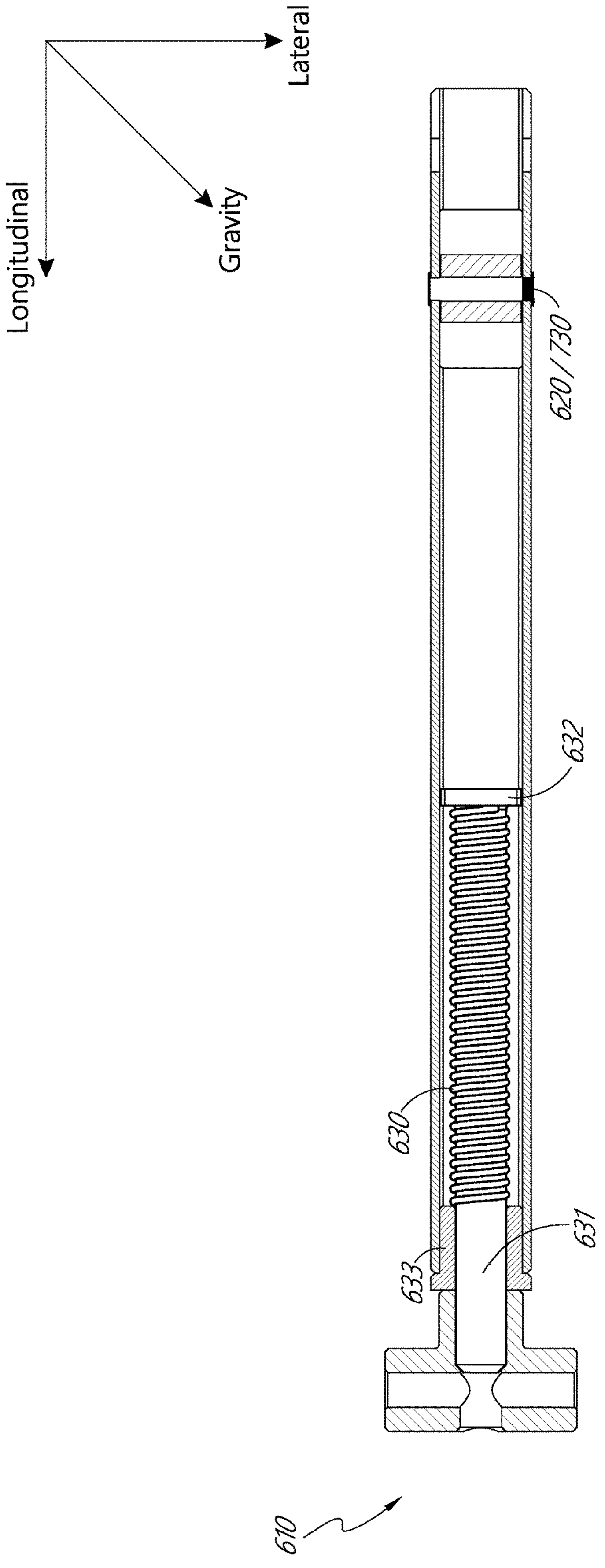
FIG. 12 is a cross-sectional top view of an embodiment of the inner tube of the retractable arm showing a spring in its designated preload compressed position.
Figure 13:
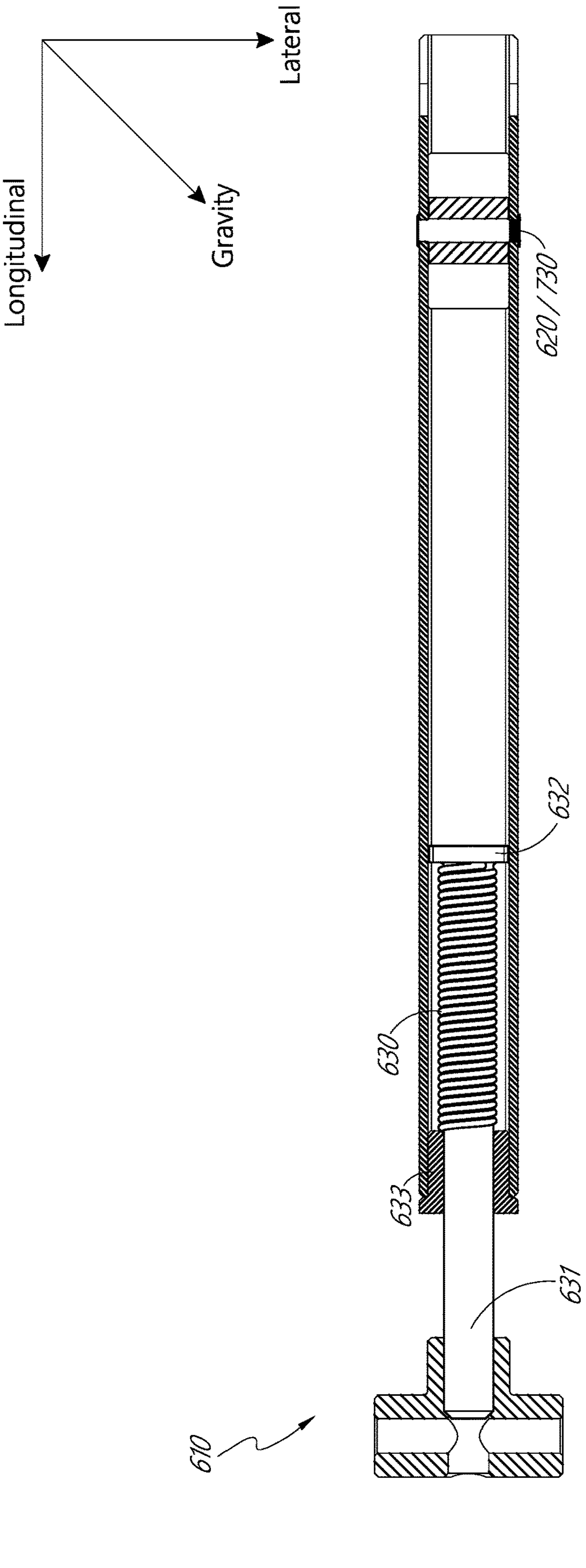
FIG. 13 is a cross-sectional top view of an embodiment of the inner tube of the retractable arm showing the spring in a compressed position.

FIGS. 11-13 illustrate an embodiment of the inner tube 610 of the retractable arm 500 comprising an emergency compression spring 630. The emergency compression spring 630 can be a resilient member or a compressible member, and can comprises a body 631, a base 632, a ridge 633, and a coiled spring 634. The base is positioned at the end of the body 631 of the emergency compression spring 630 closest to the pawl 620. The ridge 633 surrounds the body 631 of the emergency compression spring 630 furthest away from the pawl 620. The coiled spring 634 surrounds the body 631 of the emergency compression spring 630 in between the base 632 and the ridge 633. The emergency compression spring 630 generally has a coiled compressed position to a designated preload as shown in FIGS. 11 and 12, however, as depicted in FIG. 13, the emergency compression spring 630 also comprises a compressed position to a higher compression level when the door 110 of the receptacle 100 is not in the closed position and/or the retractable arm 500 is not in the retracted position and the pawl 620 of the inner tube 610 is engaged with a slot 615 of the outer tube 605 placing the retractable arm 500 in a locked position. When the emergency compression spring 630 is in the higher compressed position (See FIG. 13) it allows the door 110 to open slightly. This slight movement can be sufficient to allow removal of an appendage, such as a hand or finger that is trapped by the door 110 as the door 110 is closed. Although the door 110 will not open due to the interaction between the pawl 620 and the inner and outer tubes 610, 605, the spring will allow enough movement to remove a finger, letter, or other small object that is stuck in the door 110. The emergency compression spring 630 is helically shaped and composed of metal, plastic, rubber, or other resilient material. The shape, size, and materials used for the emergency compression spring 630 are not limited to those recited, but are selected for specific characteristics, including the ability of the emergency compression spring 630 to withstand heavy use without becoming increasingly stretched out or breaking.

When the door 110 of the receptacle 200 is in its closed position, the inner tube 610, which is connected to a lower portion of the door 110 by the second connecting mechanism 520, is disposed within the outer tube 605, and the inner and outer tubes 610, 605 are stationary relative to each other. Gravity causes the pawl 620 to hang down and extend through the opening 612 in the inner tube 610 and the first opening 606 in the outer tube 605. As the door 110 is opened, the top portion of the door 110 moves outward toward the front plate 105, and the bottom portion of the door 110 moves toward the back of the receptacle 200. Due to the second connection mechanism 520, the inner tube 610 moves within the outer tube 605, which is connected to the front of the receptacle 100 at the first connection mechanism 510. The curved surface 621 of the pawl 620 impacts an edge of the first opening 606 in the outer tube 605. This impact causes the pawl 620 to rotate about the axis, into the opening 612 in the inner tube 610. The continued movement of the door 110 causes the curved surface 621 of the pawl 620 to move along the inner surface of the outer tube 605, over the slots 615, as depicted in FIG. 7. With the curved surface 621 contacting the slots 615, a user could stop opening the door at a midway point, such as where the door 110 is only half open, and re-close the door. On reclosing, the curved surface 621 will slide along the interior surface of the outer tube 605 and along the slots 615, and offer no resistance to closing.

As the door 110 is fully opened, the pawl 620 continues to move until the pawl 620 is positioned over the second opening 607 in the outer tube 605. At this point, gravity rotates the pawl 620 so it once again extends through the opening 612 in the inner tube 610, as shown in FIG. 8. With the door 110 open, a user can insert an item into the receptacle 200 via the open door. When the item has been deposited, the user releases the handle 115 of the door 110 and the door 110 returns by gravity to its closed position.

Figure 20:
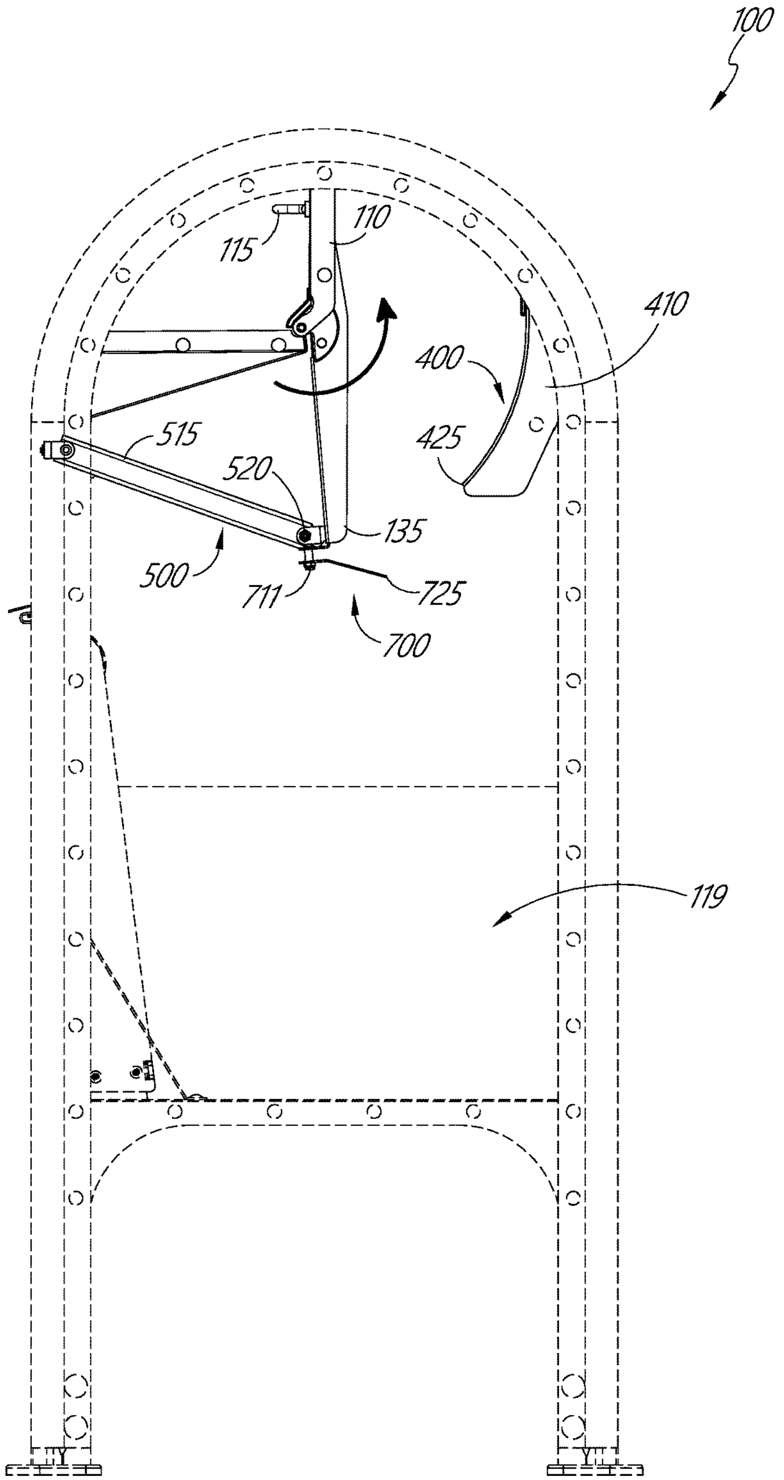
FIGS. 20-22 are cross-sectional side views of the item receptacle illustrating the movement of a door, a rake, and an anti-tearing retractable arm within the item receptacle according to an example limitation, with the receptacle shown in dashed lines for ease of illustration.

As the door is closed, the pawl 620, specifically the edge 622 of the pawl 620 impacts an inner edge of the second opening 607 in the outer tube 605. This impact causes the pawl 620 to rotate into the inner tube 610, but in a different orientation, such that the edge 622 is down, rather than the curved edge 621, as occurred when the door was opened. As the door continues to close, the edge 622 of the pawl 620 ratchets along the slots 615, with the edge of the pawl 620 sized and shaped to extend partially into the slots 615, as depicted in FIG. 9. With the pawl 620 in this position, if a user attempts to reopen the door 110 before the door 110 is fully closed, the edge 622 of the pawl 620 will lodge in one of the slots 615, and will resist movement of the door 110, as shown in FIG. 9. The pawl 620 is not free to rotate with the door at the intermediate position, so the edge 622 will prevent reopening of the door. This can protect an item inserted into the receptacle 200, as a reopening of the door 110 while the item is sliding into the receptacle could catch the item between the door 110 and the cutting edge 425 or 725 of the stopper 400 or the rake 700, as depicted in FIG. 20. Because of the emergency compression spring 630, the door can be re-opened a small amount, as the emergency compression spring 630 is compressed when the door 110 is reopened before being fully closed. This movement can allow a finger, an item, or other object to be cleared from the closing door 110 without needing to fully close the door. The emergency compression spring 630, however, will not compress sufficiently to allow the door 110 to be fully reopened.

As the door 110 is fully closed, the pawl 620 will again, aided by gravity, rotate through the opening 612 in the inner tube 610 and the first opening 606 in the outer tube 605, as depicted in FIG. 6.

FIGS. 14-18 illustrate exemplary features of the body 515 of the retractable arm 500 using a friction lock. Turning to FIGS. 14-18, the body of the retractable arm 500 using a friction lock comprises an inner tube 610 and an outer tube 705. The inner tube 610 is sized and shaped to slide inside the outer tube 705. The inner tube 610 comprises an opening 712 extending along a portion of one side of the inner tube 610.

Figure 15A:
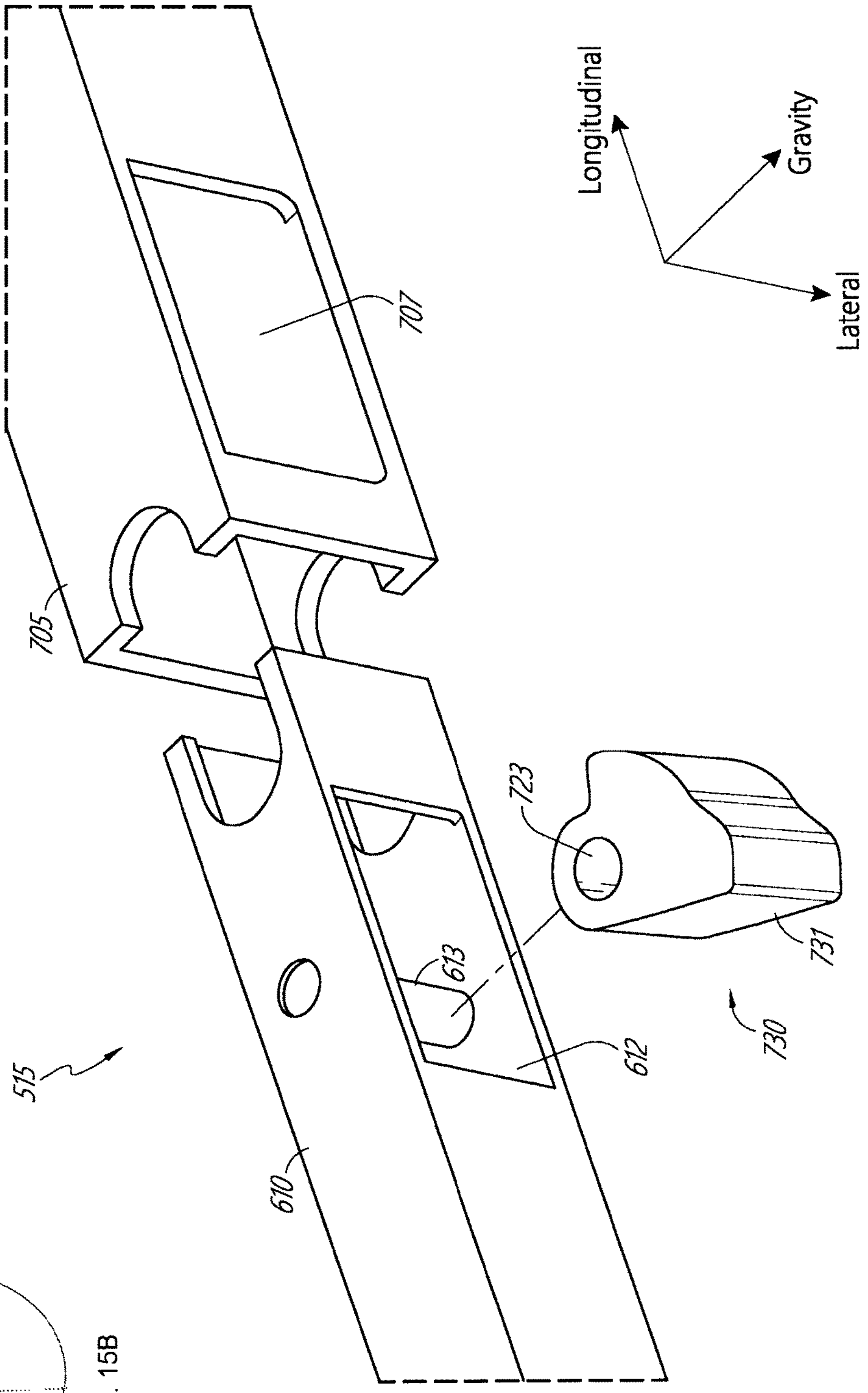
FIG. 15A is an enlarged perspective view of an embodiment of the retractable arm with a friction lock pawl showing the underside of the retractable arm with the pawl separated from the inner tube.
Figure 15B:
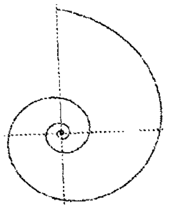
FIG. 15B is an example of a logarithmic spiral also known as the Growth Spiral, Equiangular Spiral, and Spira *Mirabilis.*
Figure 16:
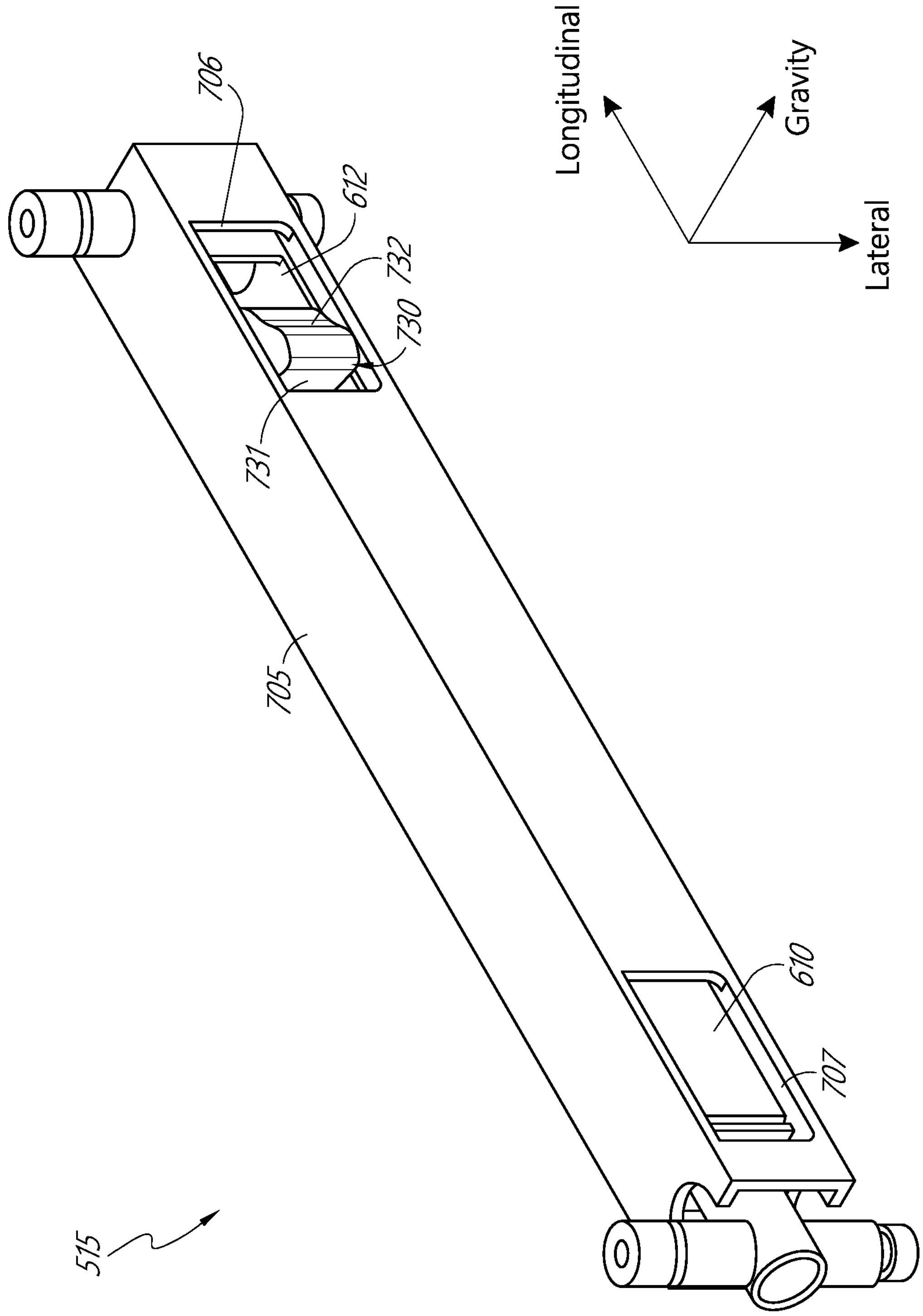
FIG. 16 is a perspective view of an embodiment of the retractable arm with a friction lock pawl showing the underside of the retractable arm in the retracted position.
Figure 17:
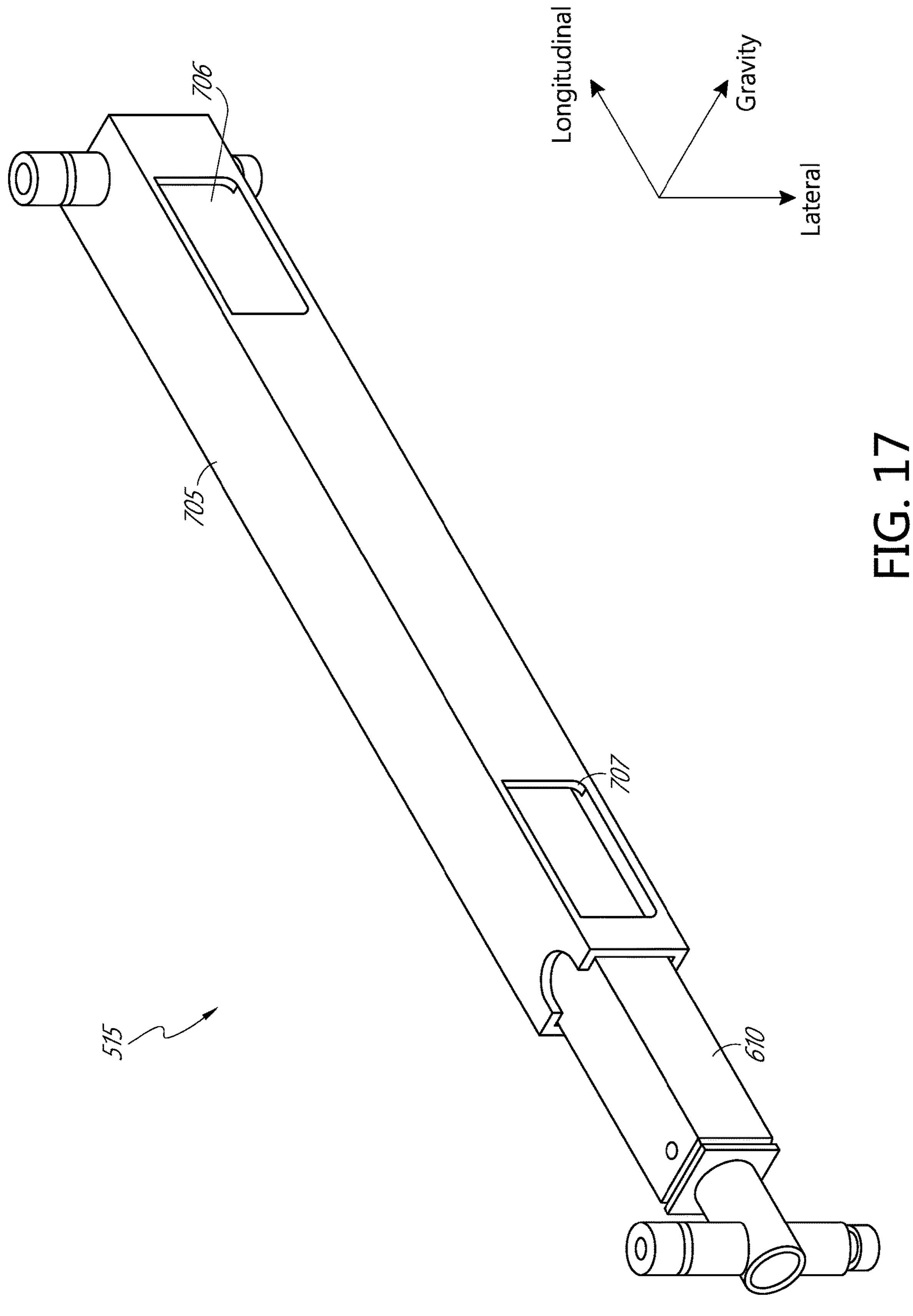
FIG. 17 is a perspective view of an embodiment of the retractable arm with a friction lock pawl (not shown) showing the underside of the retractable arm in a partially extended position.

Referring to FIGS. 14-18, a pawl 730 is disposed within the opening 612, such that the pawl can project transverse from the inner tube 610. The pawl 730 is attached to the inner tube 610 via a pivoting or rotating connection. The pawl 730 is configured to rotate about a lateral axis extending through the inner tube 610 and parallel to the opening 612, along a width or height of the inner tube 610. The pawl 730 has a hole therethrough 723 which receives a pin 613 that extends perpendicular to the longitudinal axis of the inner tube 610, and which is fixedly attached to internal surfaces of the inner tube 610. The pawl 730 can thus be retained at least partially within the inner tube 610, while being able to rotate about an axis extending through the pin, which is perpendicular to the longitudinal dimension of the inner tube 610. The pawl 730 is an elongate member and comprises a smooth surface 731 and a curved surface in the shape of a logarithmic spiral 732. The smooth surface 731 allows the pawl 730 to easily slide across a flat surface of the inside of the outer tube 705 as the inner tube 610 is sliding out of the outer tube 705, as will be described in greater detail below. The pawl 730 is elongate and attached within the inner tube 610 such that, when shown in a first position (as in FIG. 16), a portion of the pawl 730 extends through the opening 612 in the inner tube 610. When the pawl 730 is in a second, rotated position (as shown in FIG. 17) the pawl 730 is located completely or substantially within the inner tube 610.

The outer tube 705 is shaped to be larger than the inner tube 610, and is sized to receive the inner tube 610. The outer tube comprises a first opening 706 and a second opening 707. The first and second openings 706, 707 are formed in the bottom surface of the outer tube 705 and are sized and shaped to receive the pawl 730 as it rotates within the inner tube 610, as will be described in greater detail below.

Figure 18:
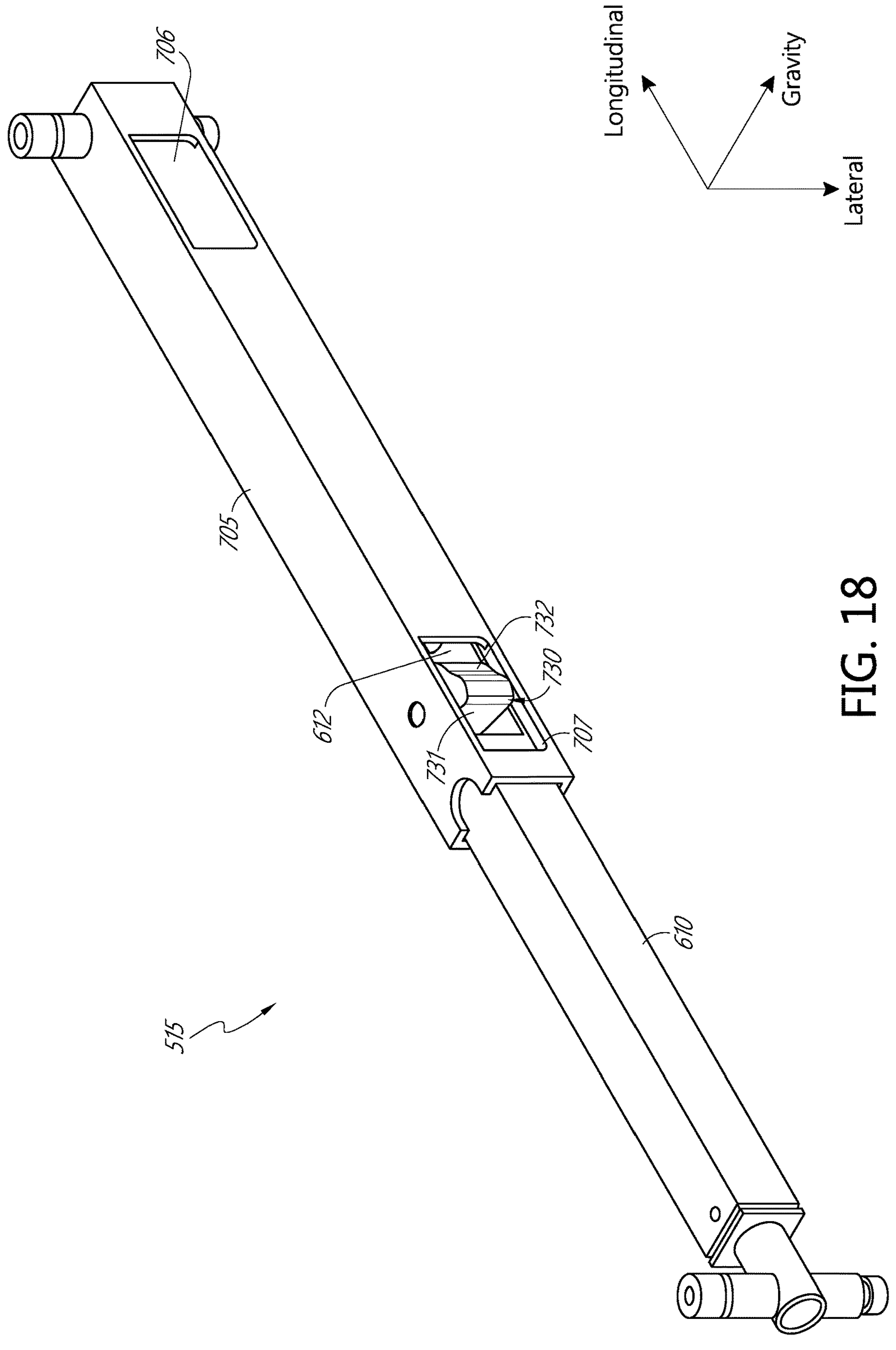
FIG. 18. is a perspective view of an embodiment of the retractable arm with a friction lock pawl showing the underside of the retractable arm in the fully extended position.

The shape and rotatable connection of the pawl 730 to the pin 613 or bar within the inner tube 610 allow the inner tube 610 to slide within the outer tube 705 until the body of the retractable arm 515 is in the fully extended position as shown in FIG. 18. The pawl 730 can rotate towards the longitudinal axis to allow the inner tube 610 to slide out of the outer tube 705. The pawl 730 rotates about a lateral axis forward towards the longitudinal axis allowing the inner tube 610 to slide back into the outer tube 705 as shown in FIG. 17 until the body 515 of the retractable arm 500 is in the fully retracted position as shown in FIG. 16.

However, once the body 515 is sliding towards the retracted position as shown in FIG. 17, the inner tube 610 can only slide inside the outer tube 705 towards the retracted position of FIG. 16 because the pawl 730, via the curved surface 732 which has the shape of a portion of the logarithmic spiral 732, locks against the inside surface of the outer tube 705 in case that reversed motion is attempted. The inner dimensions of the inner tube 610 and the dimensions of the pawl 730 prevent the pawl 730 from rotating within the inner tube 610. The engagement of the pawl 730 against the inside surface of the outer tube 705 allows the inner tube 610 to slide further inside the outer tube 705 towards the retracted position but prevents the inner tube 610 from sliding back out of the outer tube 705 towards the extended position. The body 515 of the retractable arm 500 is in the fully extended position as shown in FIG. 18 when the door 110 is in the fully open position. For the inner tube 610 to be able to slide back out of the outer tube 705 the inner tube 610 must first be within the outer tube 705 in the retracted position as shown in FIG. 16 resulting in the door 110 of the receptacle 100 being in the closed position.

The pawl 730 has one smooth surface 731 and one curved surface in the shape of a logarithmic spiral 732. The logarithmic spiral is also known as the Growth Spiral, Equiangular Spiral, and Spira *Mirabilis* and can be depicted as shown in FIG. 15B.

The logarithmic spiral can be expressed in polar coordinates as $r=ae^{be}$, where "r" is the distance from the origin, "Θ" is the angle from the x-axis, "a" is a sizing constant, and "b" is the growth constant controlling the extremity of the spiral's curvature. The logarithmic spiral is unique in that the point of intersection between the radius and the tangent to the curve has a constant angle, even as the angle from the x-axis, Θ, varies.

Figure 19:
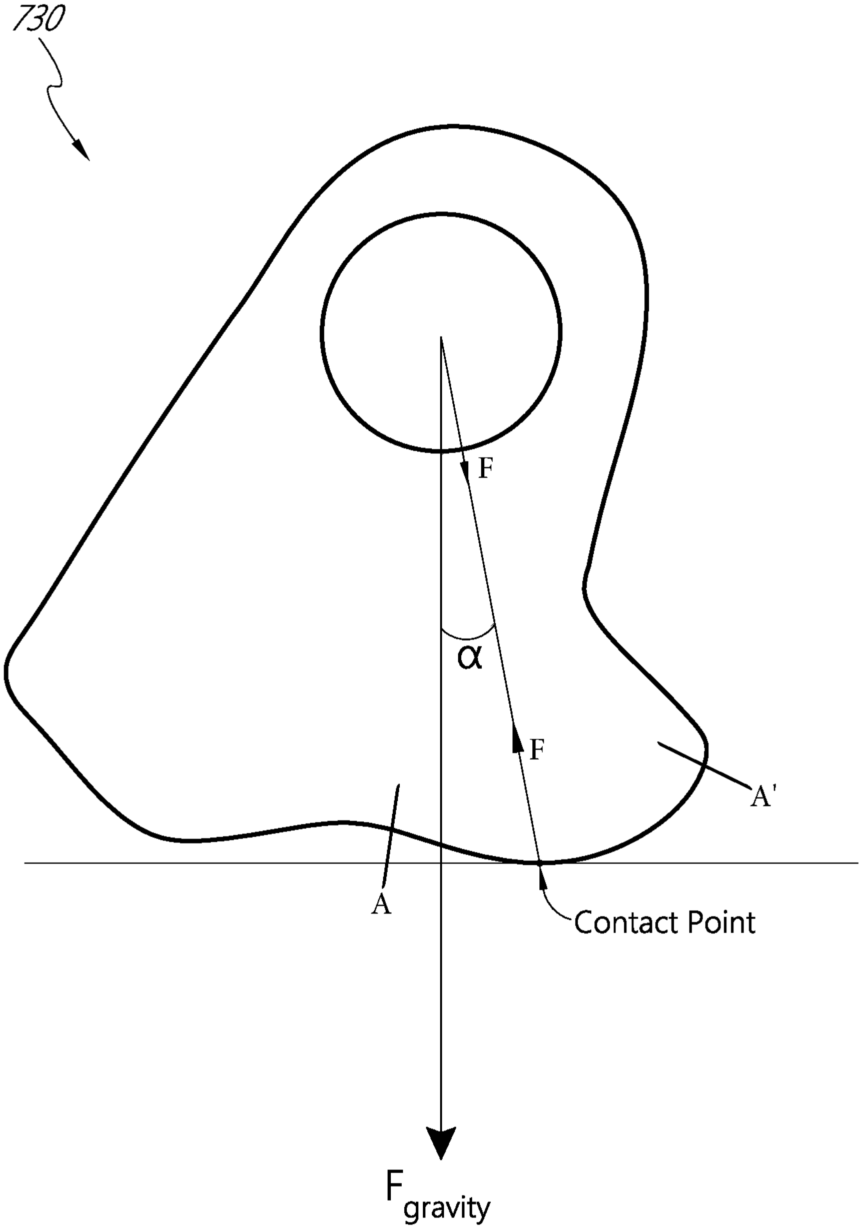
FIG. 19 is a side view of the friction lock pawl used in the retractable arm with a friction lock showing the forces exerted on the pawl when locked.

Referring to FIG. 19, neglecting the gravity force, the pawl depicted in the figure is a two-force body in equilibrium. The contour of the pawl 730 between points A and A' has a curvature corresponding to the curvature of a portion of the logarithmic spiral. In some embodiments, the contour of the pawl 730 corresponding to the logarithmic spiral can be more or less than that shown on FIG. 19. When the frictional force is greater than the force pulling the inner tube 610 out of the outer tube 705, the pawl will lock the inner tube in place. In some embodiments, the forces F on the pawl are equal and in opposite directions. The frictional force and the force pulling the inner tube 610 out of the outer tube 705 are tangential to the curved surface in the shape of a logarithmic spiral 732 of the pawl 730. Thus, another way to look at the friction lock of the pawl 730, is if the coefficient of friction, $\mu$, is greater or equal to the tan(a) as shown in FIG. 19, the pawl 730 will lock the inner tube 610 in place.

The inner tube 610 and the outer tube 705 is square, cylindrical, triangular, or any other shape that allows the inner tube 610 to slide inside the outer tube 705. The inner tube 610 and the outer tube 705 is steel or other materials that will withstand heavy use. The shape, size, and materials used for the inner tube 610 and the outer tube 705 are not limited to those recited, but are selected for specific characteristics, including the ability of the inner tube to slide in and out of the outer tube with a locking mechanism that prevents the inner tube 610 from sliding back out of the outer tube 705 until both tubes are in the fully retracted position and the ability of the inner tube 610 and the outer tube 705 to withstand heavy use.

The at least one pawl 730 is a pivoting pawl and is made from stainless steel, flat, annealed, and pickled. The shape, size, and materials used for the pawl(s) 730 are not limited to those recited, but are selected for specific characteristics, including the ability of the pawl(s) 730 to act as a locking mechanism that prevents the inner tube 610 from sliding back out of the outer tube 705 until the retractable arm 500 is in the fully retracted position and the ability of the pawl 730 to withstand heavy use.

Figure 14:
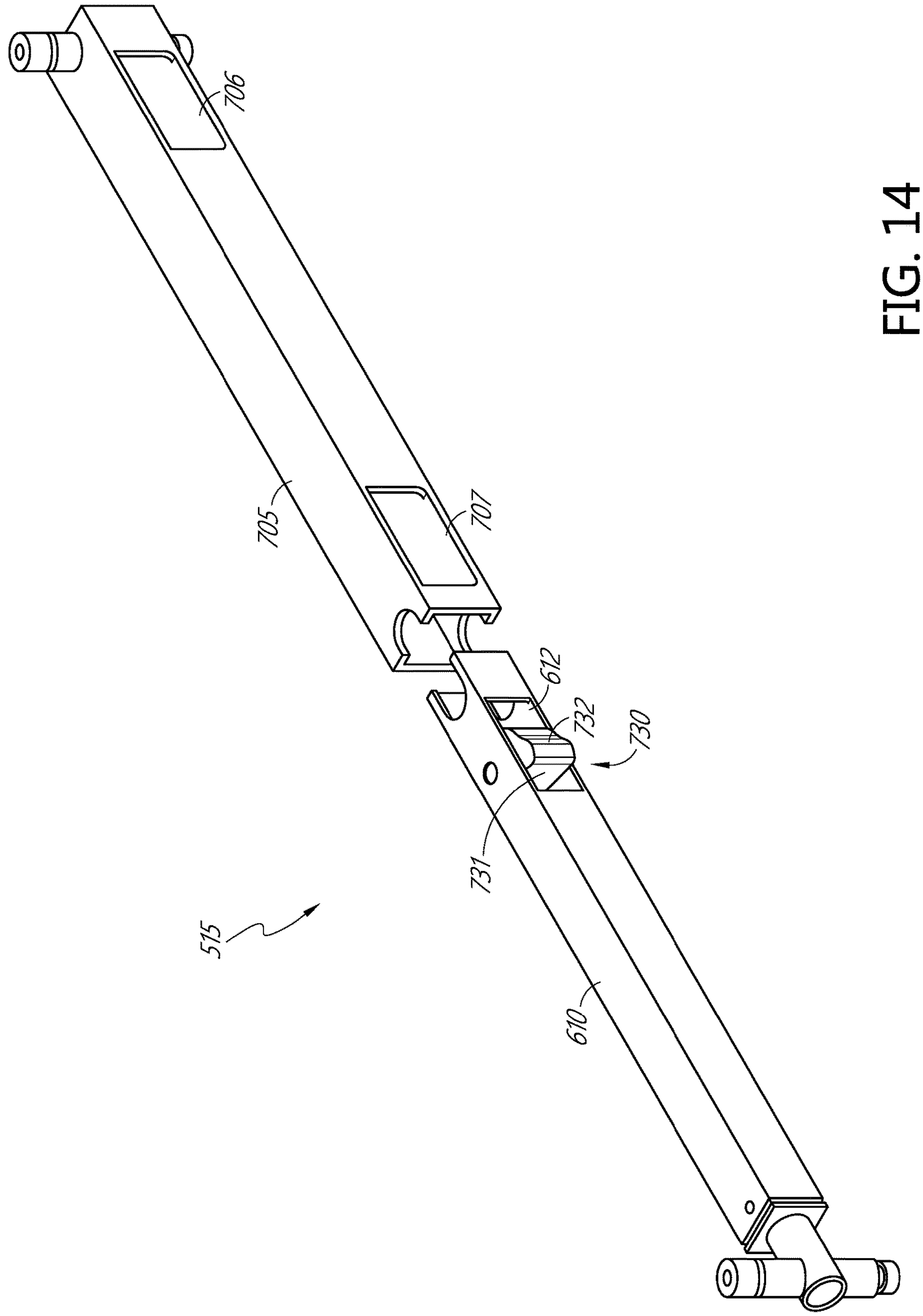
FIG. 14 is a perspective view of an embodiment of the retractable arm with a friction lock pawl showing the inner tube and the outer tube separated.

FIG. 14 illustrates an embodiment of the body 515 of the retractable arm 500 showing the inner tube 610 and the outer tube 705 separated. The inner tube 610 is configured to fit inside the outer tube 705. The pawl 730 is attached inside the inner tube 610 via a rotating axis and is positioned transverse to the inner tube 610 as a result of gravity. The pawl rotates or pivots about a lateral axis back towards the longitudinal axis or forward towards the longitudinal axis. FIG. 15 illustrates an enlarged view of FIG. 14 with the pawl 730 removed from the inner tube for ease of illustration. The pawl 730 has a hole therethrough 723 which receives the pin 613 that extends perpendicular to the longitudinal axis of the inner tube 610, and which is fixedly attached to internal surfaces of the inner tube 610. The pawl 730 is thus retained at least partially within the inner tube 610, while being able to rotate about an axis extending through the pin 613, which is perpendicular to the longitudinal dimension of the inner tube 610. The pawl 730 has a smooth surface 731 and a curved surface in the shape of a logarithmic spiral 732.

Embodiments of the retractable arm 500 having a friction lock type pawl 730 can have an emergency compression spring arrangement similar to that described above with regard to FIGS. 11-13.

The operation of the pawl 730 is described with regard to FIGS. 16-18. When the door 110 of the receptacle 100 is in its closed position, the inner tube 610, which is connected to a lower portion of the door 110 by the second connecting mechanism 520, is disposed within the outer tube 705, and the inner and outer tubes 610, 705 are stationary relative to each other. Gravity causes the pawl 730 to hang down and extend through the opening 612 in the inner tube 610 and the first opening 706 in the outer tube 705. As the door 110 is opened, the top portion of the door 110 moves outward toward the front plate 105, and the bottom portion of the door 110 moves toward the back of the receptacle 100. Due to the connection of the first connection mechanism 510 attaching the outer tube 705 to the receptacle 100 and the second connection mechanism 520 attaching the inner tube 610 to the door 110, the inner tube 610 moves within the outer tube 705. The smooth surface 731 of the pawl 730 impacts an edge of the first opening 706 in the outer tube 705. This impact causes the pawl 730 to rotate about the axis on the pin 613, into the opening 612 in the inner tube 610. The continued movement of the door 110 causes the smooth surface 731 of the pawl 730 to move along the inner surface of the outer tube 705 as depicted in FIG. 17. With the smooth surface 731 contacting the inside surface of the outer tube 705, a user could stop opening the door at a midway point, such as where the door 110 is only half open, and re-close the door. On reclosing, the smooth surface 731 will slide along the interior surface of the outer tube 705 and offer no resistance to closing the door 110.

As the door 110 is fully opened, the pawl 730 continues to move until the pawl 730 is positioned over the second opening 707 in the outer tube 705. At this point, gravity rotates the pawl 730 so it once again extends through the opening 612 in the inner tube 610, as shown in FIG. 18. With the door 110 open, a user can insert an item into the receptacle 100 via the open door. When the item has been deposited, the user releases the handle 115 of the door 110 and the door 110 returns by gravity to its closed position.

As the door is closed, the pawl 730, specifically the curved edge in the shape of a logarithmic spiral 732 of the pawl 730 impacts an inner edge of the second opening 707 in the outer tube 705. This impact causes the pawl 730 to rotate into the inner tube 610, but in a different orientation, such that the curved edge in the shape of a logarithmic spiral 732 is down, rather than the smooth edge 731, as occurred when the door 110 was opened. As the door 110 continues to close, the curved edge in the shape of a logarithmic spiral 732 of the pawl 730 slides along the inside of the outer tube 705. With the pawl 730 in this position, if a user attempts to reopen the door 110 before the door 110 is fully closed, the edge in the shape of a logarithmic spiral 732 of the pawl 730 will lodge against the inside surface of the outer tube 705, and will resist movement of the door 110. The pawl 730 is not free to rotate with the door at the intermediate position, so the edge in the shape of a logarithmic spiral 732 will prevent reopening of the door 110. This can protect an item inserted into the receptacle 100, as a reopening of the door 110 while the item is sliding into the receptacle could catch the item between the door 110 and the cutting edge 425 or 725 of the stopper 400 or the rake 700, as depicted in FIG. 20. Because of the emergency compression spring 630, the door can be re-opened a small amount, as the emergency compression spring 630 is compressed when the door 110 is reopened before being fully closed. This movement can allow a finger, an item, or other object to be cleared from the closing door 110 without needing to fully close the door. The emergency compression spring 630, however, will not compress sufficiently to allow the door 110 to be fully reopened.

As the door 110 is fully closed, the pawl 730 will again, aided by gravity, rotate through the opening 612 in the inner tube 610 and the first opening 706 in the outer tube 705, as depicted in FIG. 16.

Figure 21:
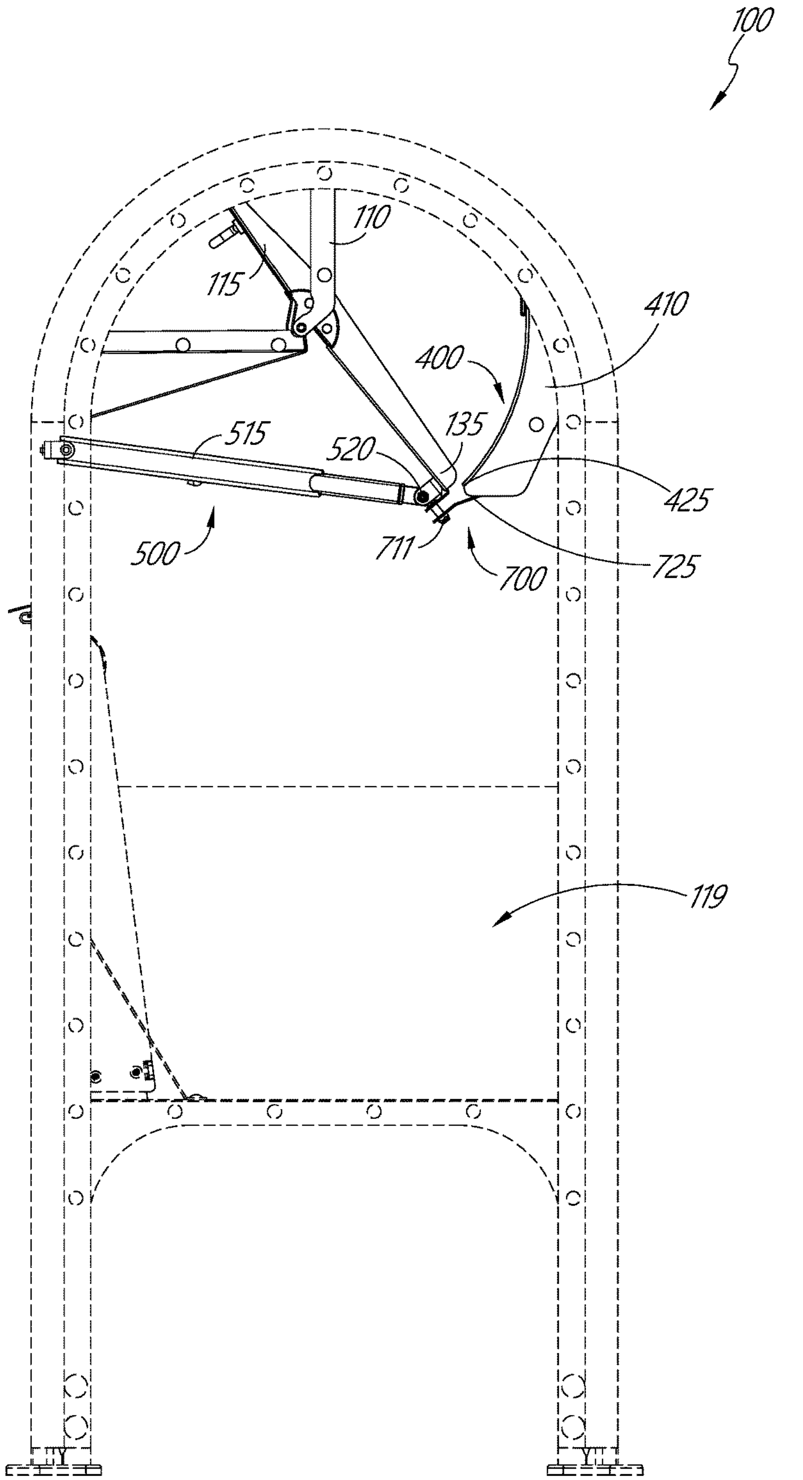
Figure 22:
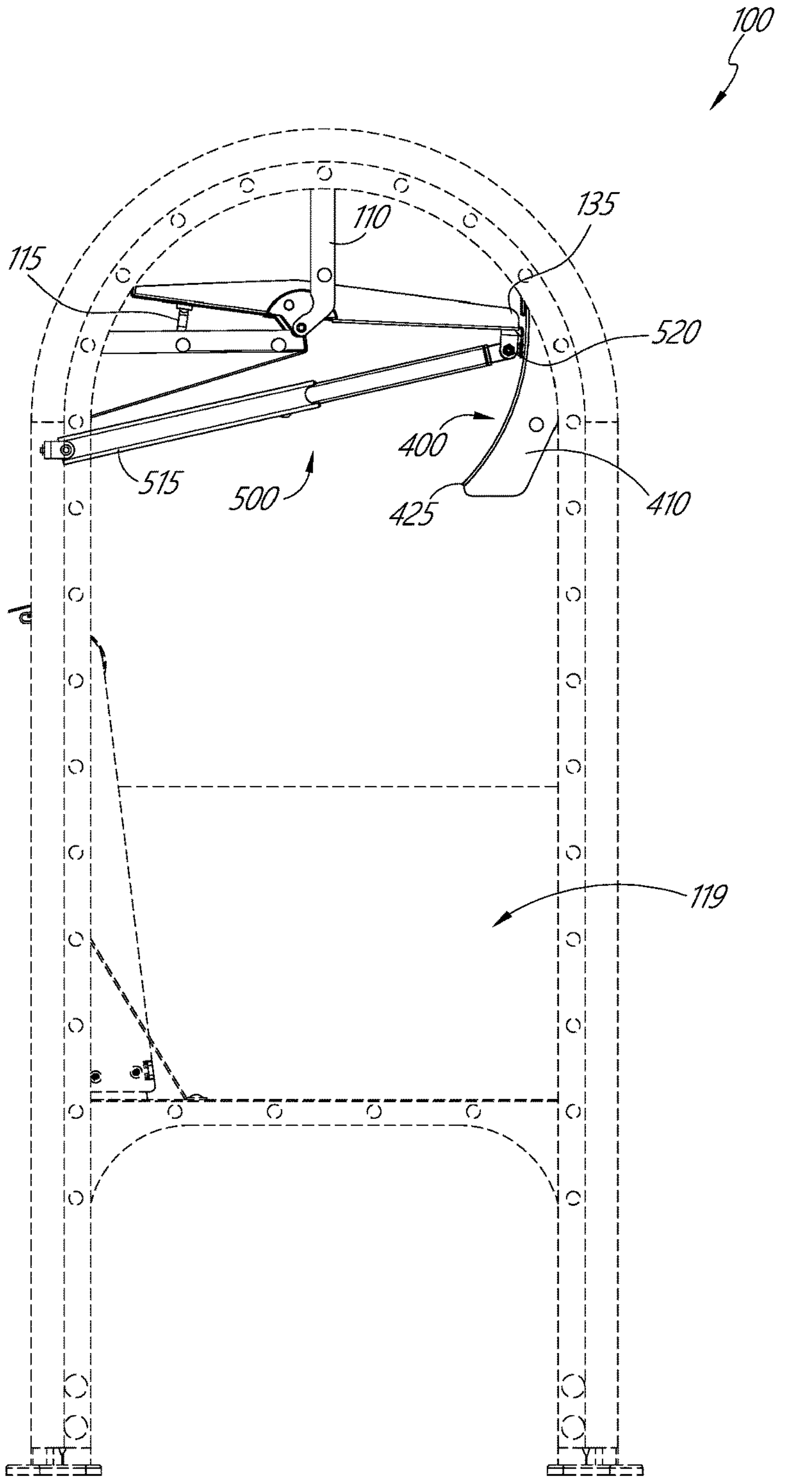

FIGS. 20-22 illustrate the operation of the anti-tearing retractable arm according to an exemplary implementation, which includes the rake 700 attached to the door 110. FIG. 20 depicts the pivoting door 110 in a closed position, and the retractable arm 500 in a retracted position. As a user pulls on the handle 115, the pivoting door 110 pivots through an intermediate position and the retractable arm 500 is partially extended, as shown in FIG. 21. As can be seen in FIG. 21, the movement of the pivoting door 110 moves the rake 700 towards the stopper 400. The attachment mechanism 711 enters into the groove 411 and moves along the groove 411. When the pivoting door 110 is fully opened and the retractable arm is fully extended, as shown in FIG. 22, the rotation of the pivoting door 110 towards the front plate 105 reveals an opening 117 for items to be placed into the receptacle 100. In this fully open position, the bottom 720 of the rake 700 slides underneath the stopper 400 and the top 710 of the rake 700 slides over the top of the stopper 400. A user deposits an item, such as a letter, parcel, and the like into the opening 117. When the pivoting door 110 is then closed by a user, or according to the retractable arm 500, or according to a biasing force (as positioned in FIG. 21), the item moves down the ramp 410 and towards the collection area 119. As discussed above, once the door begins to close partially (such as in FIG. 21), the retractable arm 500 comprises a locking mechanism that prevents the door 110 from re-opening until the door 110 is in the fully closed position (such as in FIG. 20). This allows any items placed in the opening 117 to fall into the collection area 119 as shown in FIG. 20 and prevents them from getting damaged or torn by cutting edges 425, 725 (See also FIG. 5).

As will be appreciated by FIGS. 20-22, the ramp 410 and/or rake 700 provide barriers between the opening 117 and mail collection area 119 and the retractable arm 500 prevents mail from getting damaged or torn. When the pivoting door 110 is opened, there is no access for a line to move from the opening 117 into the ramp 410, or any other portion of the item receptacle. As shown in FIGS. 21 and 22, the cutting edge 725 of the rake 700 is configured to surround the stopper 400 when the pivoting door 110 is in the open position. In some aspects, the cutting edge 725 of the rake 700 is configured to abut against the cutting edge 425 of the stopper 400. See, e.g. FIG. 21. Thus, if a line is passed between the cutting edges 725, 425, opening of the pivoting door 110 causes the rake 700 to move up towards the stopper 400 severing any line between the rake 700 and the stopper 400. In this way, any items deposited into the item receptacle 100 are less likely to be removed.

The various embodiments of devices and systems, described above in accordance with the present aspects and embodiments thus provide a means to better secure items in a receptacle without tearing or damaging the items. Of course, it is to be understood that not necessarily all objects or advantages are achieved in accordance with any particular embodiment. Thus, for example, those skilled in the art will recognize that the invention is embodied or carried out in a manner that achieves or optimizes one advantage or group of advantages as taught herein without necessarily achieving other objects or advantages as taught or suggested herein.

The foregoing description and claims refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. It is to be understood that the implementations are not limited to the precise configuration and components illustrated above. Thus, it is intended that the scope of the present invention herein disclosed should not be limited by the particular disclosed embodiments described above.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A retractable arm comprising
an outer tube comprising:
a channel extending therethrough;
a first opening formed in a surface of the outer tube proximate a first end of the outer tube; and
a second opening formed in the surface of the outer tube proximate a second end of the outer tube; and
an inner tube slidably disposed at least partially within the channel of the outer tube; and
a pawl pivotably attached to the inner tube, the pawl comprising a curved surface and a planar surface, the pawl configured to protrude at least partially from the first opening when the inner tube is at a first position within the channel, and configured to protrude at least partially from the second opening when the inner tube is at a second position within the channel,
wherein a portion of the planar surface of the pawl is in contact with an inner surface of the outer tube when the inner tube is in transition from the first position to the second position, and a portion of the curved surface is in contact with the inner surface of the outer tube when the inner tube is in transition from the second position to the first position.

2. The retractable arm of claim 1, wherein the pawl is configured to pivot so as to be within the channel when the inner tube is at an intermediate location between the first and the second positions.

3. The retractable arm of claim 1, wherein, when the curved surface of the pawl contacts the inner surface of the outer tube, the curved surface of the pawl prevents movement of the inner tube from the first position to the second position.

4. The retractable arm of claim 1, wherein the curved surface has a curvature corresponding to a portion of a logarithmic spiral.

5. The retractable arm of claim 1, wherein the retractable arm is secured to a door disposed within a housing comprising a top edge and a bottom edge, wherein the inner tube is in the first position when the door is in a closed position, wherein the inner tube is in and the second position when the door is in an open position, and wherein the inner tube must be in the first position before the door will rotate to the open position.

6. The retractable arm of claim 1 further comprising a resilient element disposed within a channel within the inner tube configured to interact with a ridge disposed in a first end of the channel, and wherein the resilient element is moveable between a designated preload and an emergency compressed position.

7. The retractable arm of claim 6, wherein the resilient element is in the emergency compressed position when the curved surface is in contact with an inner surface of the outer tube and the inner tube is moved toward the second position within the channel.

8. The retractable arm of claim 1 wherein the pawl is configured to rotate in a first direction when the inner tube is moved from the first position within the channel to the second position, and wherein the pawl is configured to rotate in a second direction when the inner tube is moved from the second position to the first position.

9. A method of operating a retraceable arm comprising:
disposing an inner tube at least partially within a channel of an outer tube in a first position, the inner tube having a pawl rotatably connected thereto and the outer tube having a first opening formed therein proximate to a first end of the outer tube and a second opening formed therein proximate to a second end of the outer tube;
moving a first portion of the inner tube out of the outer tube to an intermediate position;
rotating the pawl out of the first opening and into the outer tube;
moving a second portion of the inner tube out of the outer tube to a second, extended position;
rotating the pawl out of the outer tube to partially extend through the second opening,
contacting a planar surface of the pawl with an inner surface of the outer tube when the inner tube is transitioning from the first position to the second position; and
contacting a curved surface of the pawl with the inner surface of the outer tube when the inner tube is transitioning from the second position to the first position.

10. The method of claim 9, further comprising:
moving the second portion of the inner tube into the outer tube to the intermediate position;
rotating the pawl out of the second opening and into the outer tube;
preventing movement of the inner tube within the outer tube due to the contact of the curved surface of the pawl with the surface of the channel of the outer tube;
moving the first portion of the inner tube into the outer tube to the first position such that the pawl rotates out of the outer tube and at least partially into the first opening.

11. The method of claim 10 wherein the pawl rotates in a first direction when the inner tube is moved from the first position to the intermediate position and from the intermediate position to the second position, and wherein the pawl rotates in a second direction when the inner tube is moved from the second position to the intermediate position and from the intermediate position to the first position.

12. The method of claim 9, wherein when the first portion of the inner tube is in the intermediate position, the pawl pivots so as to be within the channel.

13. The method of claim 9, further comprising preventing movement of the inner tube toward the second position when the curved surface contacts the inner surface of the outer tube.

14. The method of claim 9, wherein the curved surface of the pawl has a curvature corresponding to a portion of a logarithmic spiral.

15. The method of claim 9, wherein the retractable arm is secured to a door disposed within a housing comprising a top edge and a bottom edge, wherein the inner tube is in the first position when the door is in a closed position, wherein the inner tube is in and the second position when the door is in an open position, and wherein the retractable arm must be in the first position before the door will rotate to the open position.

16. The method of claim 9, wherein the inner tube further comprises a resilient element disposed within a channel thereof, the resilient element configured to interact with a ridge disposed in a first end of the channel.

* * * * *